(12) United States Patent
Ueda

(10) Patent No.: US 6,208,498 B1
(45) Date of Patent: Mar. 27, 2001

(54) DRIVING METHOD AND DRIVING APPARATUS OF A SOLENOID AND SOLENOID DRIVING CONTROL APPARATUS

(75) Inventor: Yoshiaki Ueda, Fuji (JP)

(73) Assignee: Jatco Transtechnology Ltd., Fuji (JP)

( * ) Notice: Subject to any disclaimer, the term of this patent is extended or adjusted under 35 U.S.C. 154(b) by 0 days.

(21) Appl. No.: 09/203,756

(22) Filed: Dec. 2, 1998

(30) Foreign Application Priority Data

Dec. 17, 1997 (JP) .................................................... 9-348356
Dec. 25, 1997 (JP) .................................................... 9-358024

(51) Int. Cl.$^7$ ................................................. H01H 47/04
(52) U.S. Cl. ............................................. 361/160; 361/154
(58) Field of Search ................................ 361/152–156, 361/160

(56) References Cited

U.S. PATENT DOCUMENTS

| | | | |
|---|---|---|---|
| 3,982,505 | * 9/1976 | Rivere | 361/154 |
| 4,745,514 | * 5/1988 | Takeshima et al. | 361/154 |
| 4,878,147 | * 10/1989 | Oyama et al. | 361/154 |
| 4,898,361 | * 2/1990 | Bender et al. | 361/154 |
| 4,905,120 | * 2/1990 | Grembowicz et al. | 361/154 |
| 4,953,056 | * 8/1990 | Yakuwa et al. | 361/154 |
| 5,053,911 | * 10/1991 | Kopec et al. | 361/154 |
| 5,128,825 | * 7/1992 | Hurley et al. | 361/154 |
| 5,237,262 | * 8/1993 | Ashley et al. | 361/154 |
| 5,381,297 | 1/1995 | Weber | 361/153 |
| 5,430,601 | * 7/1995 | Burcham | 361/154 |
| 5,469,825 | * 11/1995 | Golab et al. | 361/154 |
| 5,471,360 | * 11/1995 | Ishikawa et al. | 361/154 |
| 5,724,223 | * 3/1998 | Feuser et al. | 361/154 |

FOREIGN PATENT DOCUMENTS

| | | |
|---|---|---|
| 38 43 277 | 6/1990 | (DE) . |
| 43 41 797 | 6/1995 | (DE) . |
| 195 22 582 | 12/1996 | (DE) . |
| 1-165381 | 11/1989 | (JP) . |
| 2-190666 | 7/1990 | (JP) . |
| 3-177669 | 8/1991 | (JP) . |

* cited by examiner

Primary Examiner—Fritz Fleming
(74) Attorney, Agent, or Firm—Foley & Lardner

(57) ABSTRACT

A solenoid supply current value is predicted from a detected battery voltage, an operational fluid temperature, and the like, and a chopper ON time during chopping drive is reduced, and relatively, a chopper OFF time is increased by using, for example, a voltage correction coefficient which becomes smaller as the battery voltage becomes larger, or a temperature correction coefficient which is set smaller as the operational fluid temperature is smaller. Alternatively, an overexciting current of the solenoid is detected at least at two time points during overexcitation, and a termination time point of the overexcitation at which the overexciting current reaches a target overexciting current is predicted from the overexciting current value, and the overexcitation is terminated when the termination time point is reached.

5 Claims, 16 Drawing Sheets (P_L) TO ACCUMULATOR PISTON

THROTTLE OPENING-DEGREE

VEHICLE SPEED →

| GEAR POSITION \ SOLENOID A | SHIFT SOLENOID A | SHIFT SOLENOID B |
|---|---|---|
| 1ST | ○ | ○ |
| 2ND | × | ○ |
| 3RD | × | × |
| 4TH | ○ | × |

○ ······ ON (DRAIN CIRCUIT CLOSED STATE)
× ······ OFF (DRAIN CIRCUIT OPEN STATE)

DRIVING METHOD AND DRIVING APPARATUS OF A SOLENOID AND SOLENOID DRIVING CONTROL APPARATUS

BACKGROUND OF THE INVENTION

1. Field of the Invention

The present invention relates to a driving method and a driving apparatus of a solenoid wherein in actuating the solenoid, a holding voltage is applied after overexciting the solenoid by applying an overexciting voltage, and relates to a driving control apparatus of various solenoids used in a vehicle automatic transmission. It is suitable, for example, in duty controlling a solenoid, after overexciting the solenoid in an initial stage, a current value is held by a chopper drive.

2. Description of the Related Art

In a general duty drive of a solenoid, for example, in order to generate a predetermined current value according to a duty ratio, a rectangular wave voltage is applied only once during a cycle time of a duty control, however, the operation is apt to delay due to a delay in response of a current value generated in the solenoid. For this reason, in the case where the response property is important, it is designed to overexcite the solenoid in an initial stage of a cycle time of the duty control, and thereafter, a holding voltage is applied. Such a driving apparatus of solenoid is known from, for example, Japanese Utility Model Laid Open Publication No. Hei 1-165381. In such a driving apparatus, 1 hydraulic solenoid valve is driven, and it is arranged to decide an overexciting time depending on an oil temperature. An overexciting current during the overexciting time is maintained, for example, at 140%, 170%, or 200% of a lowest operating current at an ordinary temperature. Furthermore, by setting a longer overexciting time at the time of low oil temperature, a smaller overexciting current may be required by the amount of extension of the overexciting time. In other words, in the case of this driving apparatus, a reliable operation of the solenoid can be achieved with small overexciting current by setting the overexciting time to be relatively long at the time of low oil temperature.

On the other hand, in place of the application of the holding voltage mentioned above, there are some driving apparatus wherein the supply voltage is chopping driven. Here, the chopping drive means a driving mode of repeating on and off at a high frequency such as for example, 1 to 2 kHz, and it is also called chopper drive. Specifically, the solenoid is overexcited at an initial stage of a cycle time of the duty control, and thereafter, a current value is held to be equal to or larger than the predetermined current value by the chopping drive. Such a chopping drive control apparatus is described, for example, in Japanese Patent Laid Open Publication Hei No. 3-177669. In this regard, "on" or "ON" represents to excite the solenoid, and "off" or "OFF" represents a non-exciting state. Also, "chopping" and "chopper" means the same meaning.

However, in the prior art driving apparatus, since the overexciting time is determined depending on an oil temperature, and since an overexciting current is supplied during the determined overexciting time irrespective of a rising condition of the overexciting current, even when the overexciting current has early risen to a current value of a minimum extent required to actuate the solenoid, it must wait for the elapse of the overexciting time, and thus, it is diftfcult to set the overexciting time to a required minimum extent. Furthermore, there is a problem that in order to actuate the solenoid reliably, the overexciting time must include a margin, and hence power consumption and the amount of generated heat are caused to increase by the amount of the margin.

Furthermore, in the solenoid drive control apparatus which performs the chopping drive as described above, an on-off period during the chopping drive, that is, a chopping frequency, and the ratio of on time to off time during one chopping cycle are constant. Accordingly, during one cycle or duty control, first, the overexcitation is made ON for a predetermined time, and then, for a duty ON time corresponding to the duty ratio, a chopper ON and a chopper OFF are repeated at each predetermined time at a single high frequency, and thereafter, an OFF state is continued.

However, a value of current supplied actually to the solenoid is affected, for example, by a voltage value of a power supply such as a vehicle-mounted battery, and by a resistance value of the solenoid itself. Moreover, the resistance value of the solenoid itself is sometimes dependent on a so-called individual difference and an operational environmental temperature. Specifically, when the resistance value of the solenoid is constant, the larger the supplied voltage value, the larger becomes the supplied current value to the solenoid, and also when the resistance value of the solenoid is small and when the operational environmental temperature is low, the supplied current value to the solenoid becomes large. In this manner, the larger the supplied current value to the solenoid than the current value corresponding to the duty ratio, the larger becomes the amount of heat generated from the solenoid, and the energy loss becomes large correspondingly. At the same time, a heat shielding structure becomes necessary, and the structure becomes complicated resulting in an increase in cost.

SUMMARY OF THE INVENTION

The present invention was made in view of the problems mentioned above, and it is an object to provide a driving method and a driving apparatus of a solenoid, and to provide a solenoid driving control apparatus which enables to suppress the power consumption and the amount of heat generated during overexcitation by setting the overexciting time to a required minimum extent, and which enables to simplify the circuit structure and to reduce the cost by avoiding the flow of excessively large current through the solenoid exceeding a necessary amount. At the same time, the present invention enables to reduce the energy loss and to simplify the structure, and to reduce the cost by suppressing and preventing the supplied current to the solenoid from increasing to a large extent exceeding a predetermined current value according to the duty ratio in the case of chopping driving of the solenoid.

In order to solve the problems, in a method of driving a solenoid in a first aspect of the invention, wherein in actuating the solenoid, a holding voltage is applied after overexciting the solenoid by applying an overexciting voltage, the method is characterized in that an overexciting current of the solenoid is detected during the overexcitation, and when the detected overexciting current reaches a target overexciting current, the overexcitation is terminated and the holding voltage is applied.

Furthermore, in a method of driving a solenoid in a second aspect of the invention, wherein in actuating the solenoid, a holding voltage is applied after overexciting the solenoid by applying an overexciting voltage, the method is characterized in that an overexciting current of the solenoid is detected during the overexcitation at least at two time points, and an overexcitation terminating time at which the predetermined target overexciting current is reached is predicted from the overexciting currents detected from the at least two time points, and when the overexcitation terminating time is reached, the overexcitation is terminated and the holding voltage is applied.

Furthermore, in a method of driving a solenoid in a third aspect of the invention, wherein in actuating the solenoid, a holding voltage is applied after overexciting the solenoid by applying an overexciting voltage, the method is characterized in that an overexciting current of the solenoid is detected during the overexcitataon, and when the detected overexciting current indicates a predetermined trend of change, the overexcitation is terminated and the holding voltage is applied.

Furthermore, in a method of driving a solenoid in a fourth aspect of the invention, characterized in that the time at which the predetermined trend of change is indicated is a time when an increase rate of the overexciting current is turned from plus to minus.

Furthermore, in a driving apparatus of a solenoid in a fifth aspect of the invention, wherein in actuating the solenoid, a holding voltage is applied after overexciting the solenoid by applying an overexciting voltage, the driving apparatus is characterized by current detecting means for detecting an overexciting current of the solenoid during the overexcitation, and control means for terminating the overexcitation and applying the hold voltage when the overexciting current detected by the current detecting means reaches a predetermined target overexciting current.

Furthermore, in a driving apparatus of a solenoid in a sixth aspect of the invention, wherein in actuating the solenoid, a holding voltage is applied after overexciting the solenoid by applying an overexciting voltage, the driving apparatus is characterized by current detecting means for detecting the overexciting current of the solenoid at least at two time points during the overexcitation, predicting means for predicting an overexcitation terminating time at which the overexciting current reaches a predetermined target overexciting current, and control means for terminating the overexcitation and applying the holding voltage when the target overexciting current is reached.

Furthermore, in a driving apparatus of a solenoid in a seventh aspect of the invention, wherein in actuating the solenoid, a holding voltage is applied after overexciting the solenoid by applying an overexciting voltage, the driving apparatus is characterized by current detecting means for detecting the overexciting current of the solenoid during the overexcitation, and control means for terminating the overexcitation and applying the holding voltage when the overexciting current detected by the current detecting means indicates a predetermined trend of change.

Furthermore, in a driving apparatus of a solenoid in a eighth aspect of the invention, characterized in that the control means terminates the overexcitation and applies the holding voltage when a rate of increase of the overexciting current detected by the current detecting means turns from plus to minus.

Furthermore, in a driving apparatus of a solenoid in a ninth aspect of the invention, characterized in that the current detecting means detects the overexciting current indirectly from electrical factors corresponding to the overexciting current of the solenoid during the overexcitation.

Furthermore, in a solenoid driving control apparatus in a tenth aspect of the invention, for holding a current value supplied to the solenoid at a predetermined value by chopping drive after overexciting the solenoid, the control apparatus is characterized by electrical operating environment detecting means for detecting an electrical operating environment of the solenoid, and correcting means for correcting the chopping driving state by comparing the electrical operating environment of the solenoid detected by the electrical operating environment detecting means with a preset electrical operating environment.

Furthermore, in a solenoid driving control apparatus in a eleventh aspect of the invention, characterized in that the electrical operating environment detecting means comprises supplied current detecting means for detecting a supplied current value to the solenoid.

Furthermore, in a solenoid driving control apparatus in a twelfth aspect of the invention, characterized in that the electrical operating environment detecting means comprises supplied voltage value detecting means for detecting a supplied voltage value to the solenoid.

Furthermore, in a solenoid driving control apparatus in a thirteenth aspect of the invention, characterized in that the electrical operating environment detecting means comprises resistance value detecting means for detecting a resistance value of the solenoid.

Furthermore, in a solenoid driving control apparatus in a fourteenth aspect of the invention, characterized in that the correcting means changes an on-off period at the time of chopping driving of the solenoid.

Here, "on" represents to excite the solenoid, and it is also denoted as "ON", and "off" represents a non-exciting state of the solenoid, and it is also denoted as "OFF". Furthermore, the small value equal to or larger than the predetermined value means a current value which is equal to or larger than a predetermined current value which must be supplied to the solenoid according to the duty ratio, but it is a current value having a value as small as possible.

Furthermore, in a solenoid driving control apparatus in a fifteenth aspect of the invention, characterized in that the correcting means changes a relative on time ratio at the time of chopping driving of the solenoid.

Furthermore, in a solenoid driving control apparatus in a sixteenth aspect of the invention, for holding a supplied current value to a solenoid at a predetermined current value by chopping driving after overexciting the solenoid, the control apparatus is characterized by operational environment temperature detecting means for detecting an operational environment temperature of the solenoid, and correcting means for correcting the chopping driving state by comparing the operational environment temperature detected by the operational environment temperature detecting means with a preset operational environment temperature.

Furthermore, in a solenoid driving control apparatus in a seventeenth aspect of the invention, characterized in that the correcting means changes an on-off period at the time of chopping driving of the solenoid.

Furthermore, in a solenoid driving control apparatus in a eighteenth aspect of the invention, characterized in that the correcting means changes a relative on time ratio at the time of chopping driving of the solenoid.

DESCRIPTION OF THE PREFERRED EMBODIMENTS

Hereinafter, various embodiments wall be described with reference to the attached drawings, wherein a solenoid driving control apparatus according to the present invention is developed into an operational fluid pressure control apparatus in various embodiments.

First Embodiment

Figure 1:
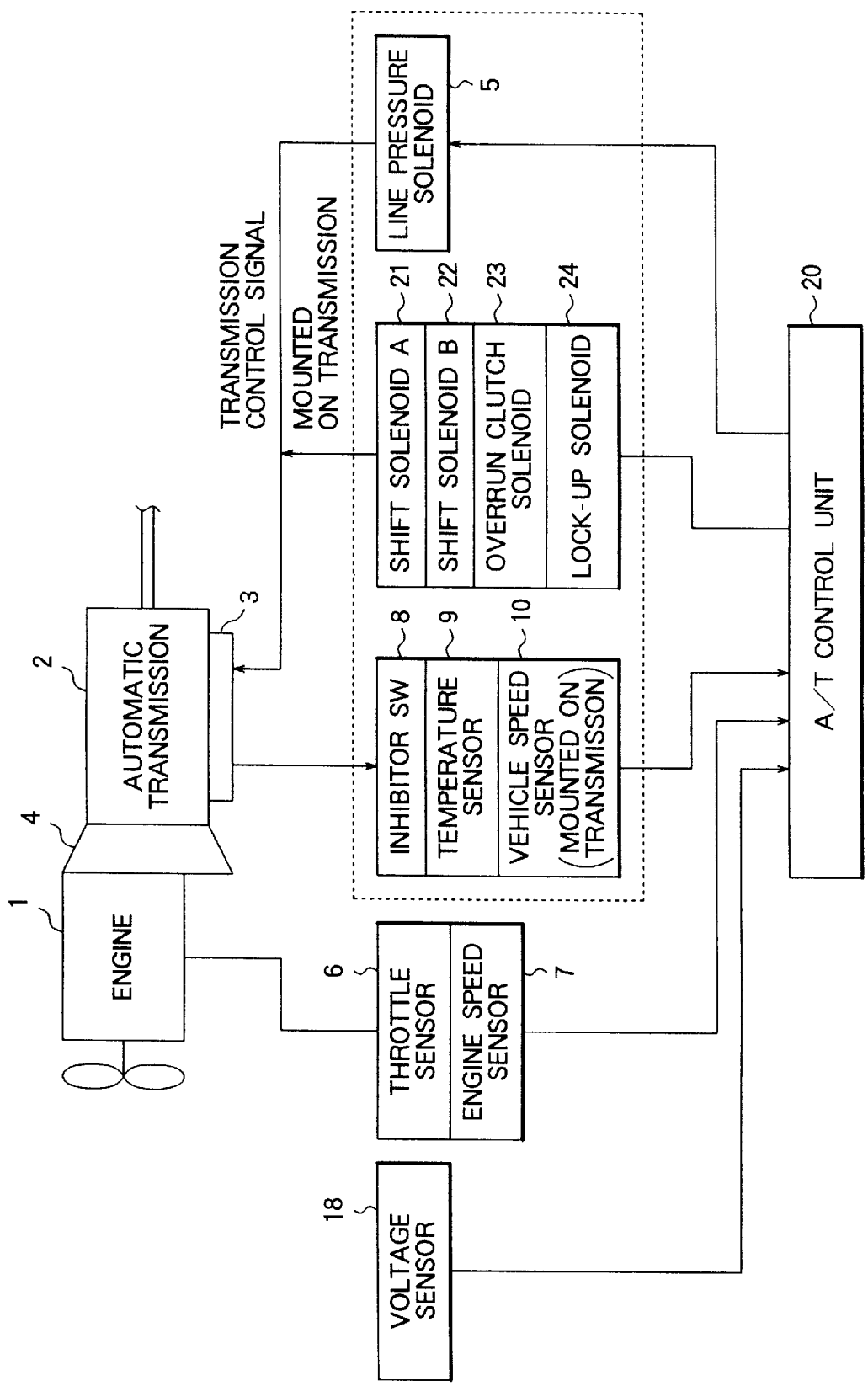
FIG. 1 is a diagram of an arrangement showing an example of an automatic transmission and its control apparatus.

FIG. 1 is a schematic arrangement diagram of an automatic transmission of a vehicle and its control apparatus wherein a solenoid driving apparatus according to the present invention is developed. In this embodiment, the output of an engine 1 which is a prime motor is transmitted to rear left and right driving wheels (not shown) through an automatic transmission 2. A common valve body is mounted on a lower portion of the automatic transmission 2, and an actuator unit 3 as a fluid device is formed by mounting various valves on the valve body. Furthermore, a torque converter 4 interposing between the engine 1 and the automatic transmission 2 is a lock-up mechanism, thai is, attached with a lock-up clutch and known in the art. A release side fluid chamber is formed between a lock-up facing and a torque converter cover, and an opposite side of the lock-up facing is an apply side fluid chamber. As will be described later, by changing over a lock-up control valve, when the operational fluid pressure to the apply side fluid chamber is increased, this state is called as a lock-up state, whereas when the operational fluid pressure to the release side fluid chamber is increased, it is called a unlock-up state.

The structure within the automatic transmission 2 and the structure within the actuator unit 3 are similar or substantially similar to that described, for example, in Japanese Patent Laid Open Publication Hei No. 2-190666, and hence, detailed explanation is omitted except for main solenoids and control valves because this publication may be referenced as to details. In this respect, the basic transmission structure within the automatic transmission 2 is comprised of known two rows of planetary gears, and the ratio of input to output rotational speed, that is, the speed reduction ratio can be changed by fixing or releasing any of a sun gear, a pinion, and a ring gear which constitute each planetary gear mechanism. Furthermore, when enumerate various kinds of friction elements which participate in the speed change, the change-over of forward and backward movements, or the lock-up control within the automatic transmission 2, the speed change control is achieved by selecting the coupling or release of the low and reverse brake, various brake bands, and the high clutch by an operational fluid pressure from two shift solenoids A21 and B22, the change-over control of forward and backward movements is achieved by coupling either one of the forward clutch and the backward clutch and by releasing the other, and the control of engine brake effect is achieved by controlling the coupling and release of the overrun clutch by the operational fluid pressure from the overrun clutch solenoid 23, and the lock-up control is achieved by controlling the coupling and release of the lock-up clutch within the torque converter by the operational fluid pressure from the lock-up solenoid 24.

Figure 2:
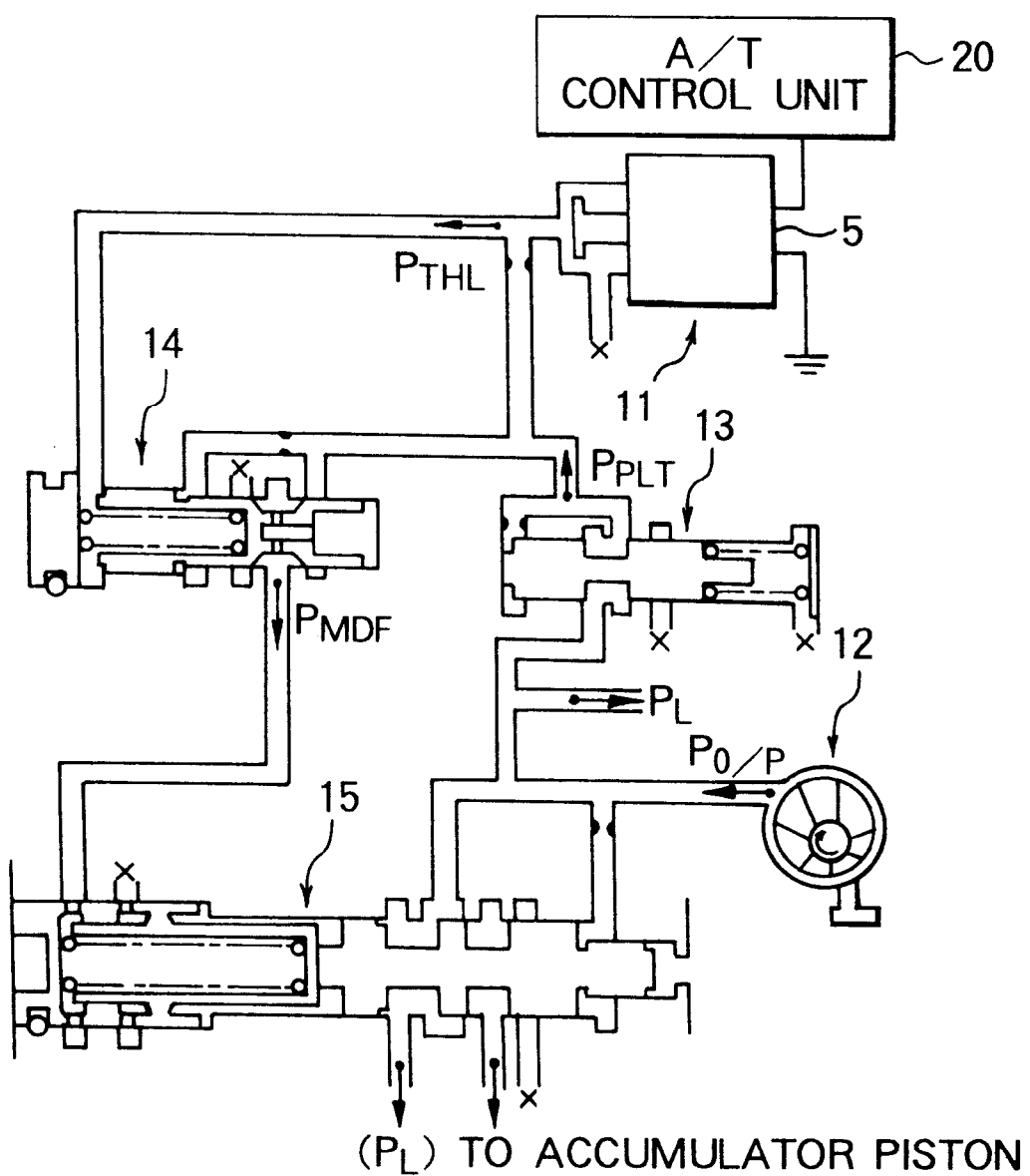
FIG. 2 is an explanation diagram of valves which control a line pressure.

Next, with reference to FIG. 2, a valve arrangement for controlling the line pressure will be explained briefly, among various solenoids and valves within the actuator unit 3. The reference numeral 11 denotes a line pressure controlling duty valve which is driven by a driving signal $D_{PL}$ from an automatic transmission control unit 20 (hereinafter, it is also simply abbreviated as "A/T control unit), and which controls a line pressure $P_L$ supplied to the whole of the actuator unit 3. The solenoid which controls the line pressure controlling duty valve 11 is a line pressure solenoid 5. A part of a pump pressure $P_{O/P}$ which is a discharge pressure from a pump 12 is transformed by a pilot valve 13 of the output pressure feedback type into a constant pressure, that is, a pilot pressure $P_{PLT}$, and its drain quantity is regulated by the line pressure controlling duty valve 11 to create a throttle pressure $P_{THL}$. This throttle pressure PTHL serves as a pilot pressure of a pressure modifier valve 14 of the output pressure feedback type which divides the pilot pressure $P_{PLT}$, and creates a pressure modifier pressure $P_{MDF}$. This pressure modifier pressure $P_{MDF}$ serves as a pilot pressure of a line pressure control valve 15 for dividing the line pressure $P_L$ from the pump pressure $P_{O/P}$, and divides the pump pressure $P_{O/P}$ into a mainly upstream side line pressure $P_L$ and a supply pressure to a downstream side accumulator piston. Accordingly, when the duty ratio to a line pressure solenoid 5 of the line pressure controlling duty valve 11 is controlled, although it is indirectly, the line pressure $P_L$ can be controlled. By such arrangement in this embodiment, except for a predetermined dead zone, a (target) line pressure $P_{L(OR)}$ is lineally increased as a duty ratio $D/T_{PL}$ (in this case, the ratio of an ON state as the solenoid) of a control signal or a driving signal to the line pressure solenoid 5 is decreased.

Next, with reference to FIG. 3, an electric circuit for controlling the line pressure $P_L$, in particular, an arrangement of a driving circuit 15 for a line pressure solenoid will be described. This driving circuit 15 includes both a first switching element Tr1 to turning on and off the line pressure solenoid 5, and a second switching element Tr2 for controlling a reflex current of the line pressure solenoid 5. These switching elements may be replaced by FETs or the like in actual case, however, here it will be explained as normal transistor elements. Specifically, first, one end of a vehicle-mounted battery which is a power supply is connected to ground, and the first switching element Tr1 is constituted by a PNP type transistor having a collector connected to one end of the line pressure solenoid 5, and having an emitter connected to a non-grounded side of the vehicle-mounted battery, and having a base connected to a collector of a separate first subswitching element Tr1'. Furthermore, this first subswitching element Tr1' is constituted by an NPN type transistor having a collector connected to the non-grounded side of the vehicle-mounted battery through a first resistor R1, and having an emitter connected to ground, and having a base connected to a microcomputer not shown. This base is supplied with an A port control signal $S_{PORT-A}$ to control the turn on and off of the line pressure solenoid 5. Furthermore, a zener diode $D_Z$ is connected between the collector and emitter of the first switching element Tr1 to restrict flow of current from the emitter to collector and to allow flow of current at a certain voltage level or higher. The other end of the line pressure solenoid 5 is grounded.

On the other hand, the second switching element Tr2 is constituted by an NPN type transistor having a collector connected to ground through a diode D which conducts the reflex current of the line pressure solenoid 5, that is, conducts a current from the ground side of the line pressure solenoid 5 to the first switching element Tr1 side. The second switching element Tr2 has an emitter connected to one end of the line pressure solenoid 5 and to a normally conducting side of the zener diode $D_Z$, and having a base connected to the collector of the second subswitching element Tr2'. Furthermore, this second subswitching element Tr2' is constituted by a PNP type transistor, and it has a collector connected to the base of the second switching element Tr2, has an emitter connected to the non-ground side of the vehicle mounted battery not shown, and has a base connected to a collector of a separate second sub-subswitching element Tr2". Furthermore, the second sub-subswitching element Tr2" is constituted by an NPN type transistor, and it has a collector connected to the non-ground side of the vehicle mounted battery through a second resistor R2, and has an emitter connected to ground, and has a base connected to a microcomputer not shown. This base is supplied from the microcomputer with a B port control signal $S_{PORT-B}$ which controls the turn on and off of the reflex current of the line pressure solenoid 5.

Here, a basic action of the driving circuit 15 will be briefly explained. The reflex current of the solenoid is a current which is caused by an inductance of a coil at the instant of OFF of the solenoid. For example, at the time of finely on-off controlling the solenoid, as is the case where the line pressure solenoid 5 is overexcited or is chopping controlled, the second switching element Tr2 is made to be in a closed state, that is, the reflex current is allowed to flow through the solenoid 5 freely by making the B port control signal $S_{PORT-B}$ enter an ON state, and in this state, the first switching element Tr1 is opened and closed. That is, the A port control signal $S_{PORT-A}$ is changed over between ON state and OFF state. On the other hand, when the chopping driving is to be terminated at the time of termination of the duty control or the like, the first switching element Tr1 is opened. That is, the A port control signal $S_{PORT-A}$ is made to enter an OFF state, and at the same time, the second switching element Tr2 is opened, that is, the B port control signal $S_{PORT-B}$ is made to enter an OFF state. Then the reflex current which intends to generate in the line pressure solenoid 5 does not flow, and a potential difference is produced (called as clamp) at a non-conducting side of the zener diode $D_Z$. As a result, a reverse current intends to flow instantly in the line pressure solenoid 5, and a current value which has been present is reduced quickly. In other wards, assuming that the above-mentioned overexcitation enhances the response property at the time of start up of the solenoid, it could be said that the control of the reflex current enhances the response property of the solenoid at the time of decay. In this respect, the details of this reflex current is described, for example, in the above-mentioned Japanese Patent Laid Open Publication Hei No. 3-177669, and hence detailed description is omitted.

On the other hand, a throttle valve is provided in an intake pipe line of the engine 1, and the throttle valve is opened and closed depending on the amount of depression of an accel pedal by the driver. A throttle opening-degree sensor 6 for detecting an opening-degree (hereinafter, it is also denoted as a throttle opening-degree) TVO is mounted on the throttle valve. Furthermore, an engine speed sensor 7 ror detecting a rotational speed (hereinafter, it is also denoted as an engine speed) $N_E$ is mounted on the output shaft of the engine 1. In this respect, a detection signal or the throttle opening-degree TVO detected by the throttle opening-degree sensor 6 indicates that the throttle opening-degree TVO is large and the amount of depression of the accel pedal is large. Furthermore, the engine speed sensor 7 may be arranged to detect the engine speed from an ignition spark pulse of the engine.

Also, an operational fluid temperature sensor 9 for detecting a temperature TMP or the operational fluid within a reservoir is provided in the actuator unit 3. Furthermore, an inhibitor switch (SW in the figure) 8 is mounted on a selecting lever which selects a shift position of the automatic transmission 2, and the inhibitor switch 8 detects a selected shift position and outputs a shift range signal $S_{RANGE}$ corresponding thereto. This shift range signal $S_{RANGE}$ corresponds to P, R, N, D, 2, and L according to a shift position of an actual vehicle. Moreover, a vehicle speed sensor 10 is also mounted on the output shaft or the automatic transmission 2. Furthermore, separate from these members, a voltage sensor 18 is provided to detect a voltage of the vehicle mounted battery as a battery voltage $V_{BTT}$.

Figure 4:
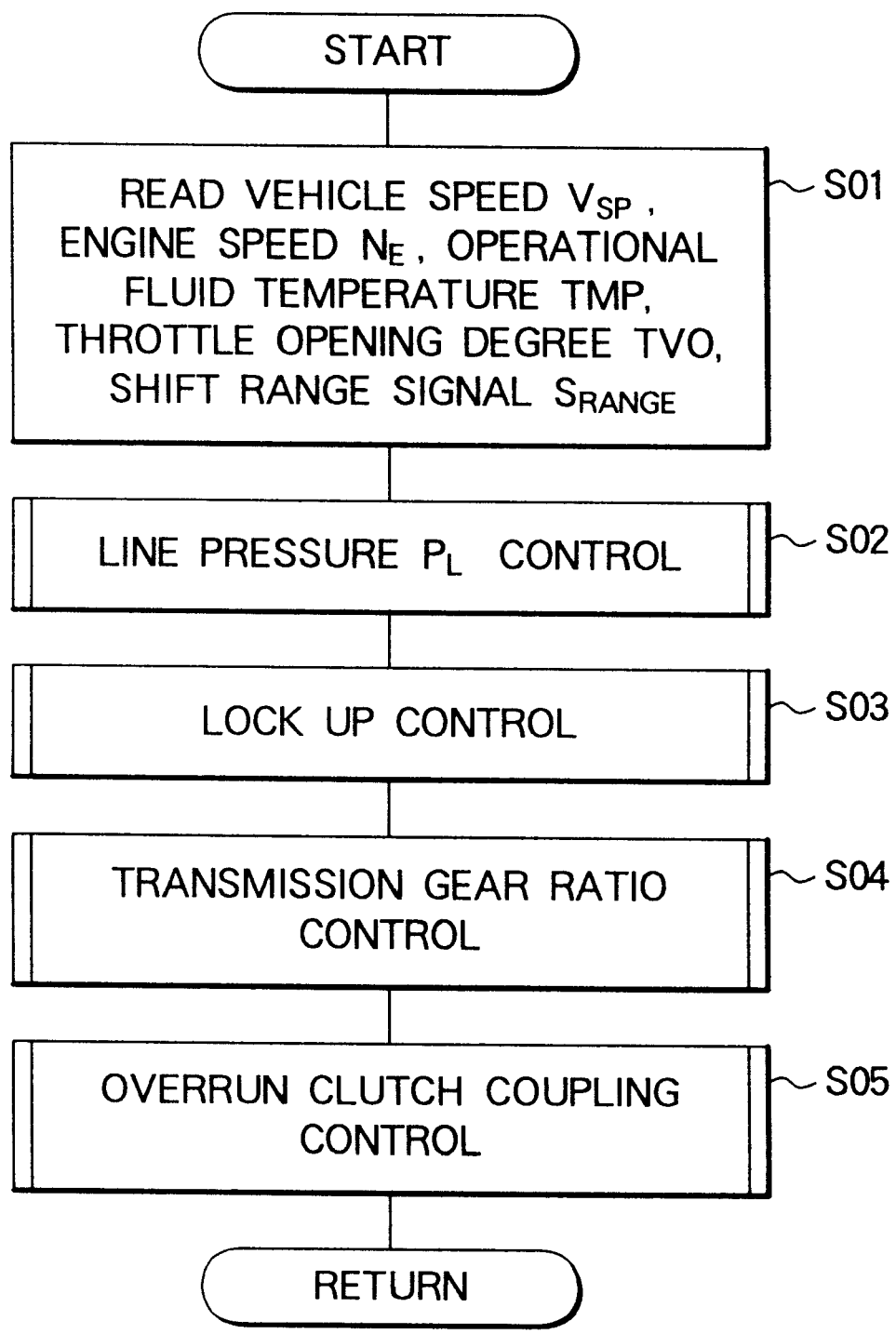
FIG. 4 is a flowchart showing a general flow of a speed change control executed in a control unit in FIG. 1.

The A/T control unit 20 includes a microcomputer as control means for outputting a control signal which controls the automatic transmission 2 and the actuator unit 3 by executing, for example, an arithmetic processing of FIG. 4 described later. The A/T control unit 20 also includes a driving circuit for converting the control signal delivered from the microcomputer into a driving signal adapted to an actual actuator, that is, each of the above-mentioned solenoids. Among these, the microcomputer includes an input interface circuit having, for example, an A/D conversion function or the like, an arithmetic processing unit such as a microprocessor or the like, a memory device such as a ROM, RAM or the like, an output interface circuit having, for example, an D/A conversion function, and the like. This microcomputer performs, for example, obtaining an optimum line pressure $P_L$ for transmitting an input engine torque, calculating a duty ratio $D/T_{PL}$ of the line pressure solenoid 5 required to achieve the preceding step, outputting a line pressure control signal $S_{PL}$ according to the line pressure control duty ratio $D/T_{PL}$, or calculating a duty ratio $D/T_{L/U}$ of the lock-up solenoid 24 optimum to lock-up/unlock-up control the torque converter 4, outputting a lockup control signal $S_{L/U}$ according to the lock-up control duty ratio D/TL/U, obtaining an operating state of the two shift solenoids A21, B22 required to achieve a transmission gear ratio according to a vehicle speed $V_{SP}$ and a throttle opening-degree TVO, outputting transmission gear ratio control signals $S_{SFT1}$ and $S_{SFT2}$ to operate the two shift solenoids, obtaining an operating state of the overrun clutch solenoid 23 for coupling the overrun clutch when an engine brake range, for example, 2-range or L-range is selected, and outputting an overrun clutch coupling control signal $S_{CL}$ to achieve the coupling.

Furthermore, each driving circuit converts each control signal delivered from the microcomputer into a driving signal suitable to drive an actuator corresponding to each control signal, and delivers the converted signal. Furthermore, the type of the control signal and a pulse control signal according to the duty ratio delivered from the microcomputer satisfies a desired duty ratio and the number pulses, and as will be seen from the driving circuit 15 for line pressure solenoid, each driving circuit merely performs an electrical processing such as amplification, and does not process the type of signal itself.

Next, with reference to FIG. 4, a schematic arrangement or the whole speed change control in this embodiment will be explained in accordance with an arithmetic processing of a general flow shown therein. This arithmetic processing is basically a brief summary of the speed change control in a condition wherein the D-range is selected and there is no request from the engine control unit side, and its details may be referred to the above-mentioned Japanese Patent Laid Open Publication Hei No.2-190666, and here only the outline or the general flow will be described. This arithmetic processing is executed as a timer interrupt processing at each predetermined sampling time (for example, 20 msec) Δ To. In this respect, in an arithmetic processing following this, any step is not provided for communication in particular, however, it is assumed that a program and a map required in an arithmetic processing unit within the microcomputer, or required data is read from the memory device at suitable time, and conversely, data calculated in the arithmetic processing unit is suitably updated and stored in the memory device.

In this arithmetic processing, first, in step S01, a vehicle speed $V_{SP}$ is read from the vehicle speed sensor 10, an engine speed $N_E$ is read from the engine speed sensor 7, an operational fluid temperature TEM is read from the operational fluid temperature sensor 9, a throttle opening-degree TVO is read from the throttle opening-degree sensor 6, and a shift range signal $S_{RANGE}$ is read from the inhibitor switch S.

Figure 7:
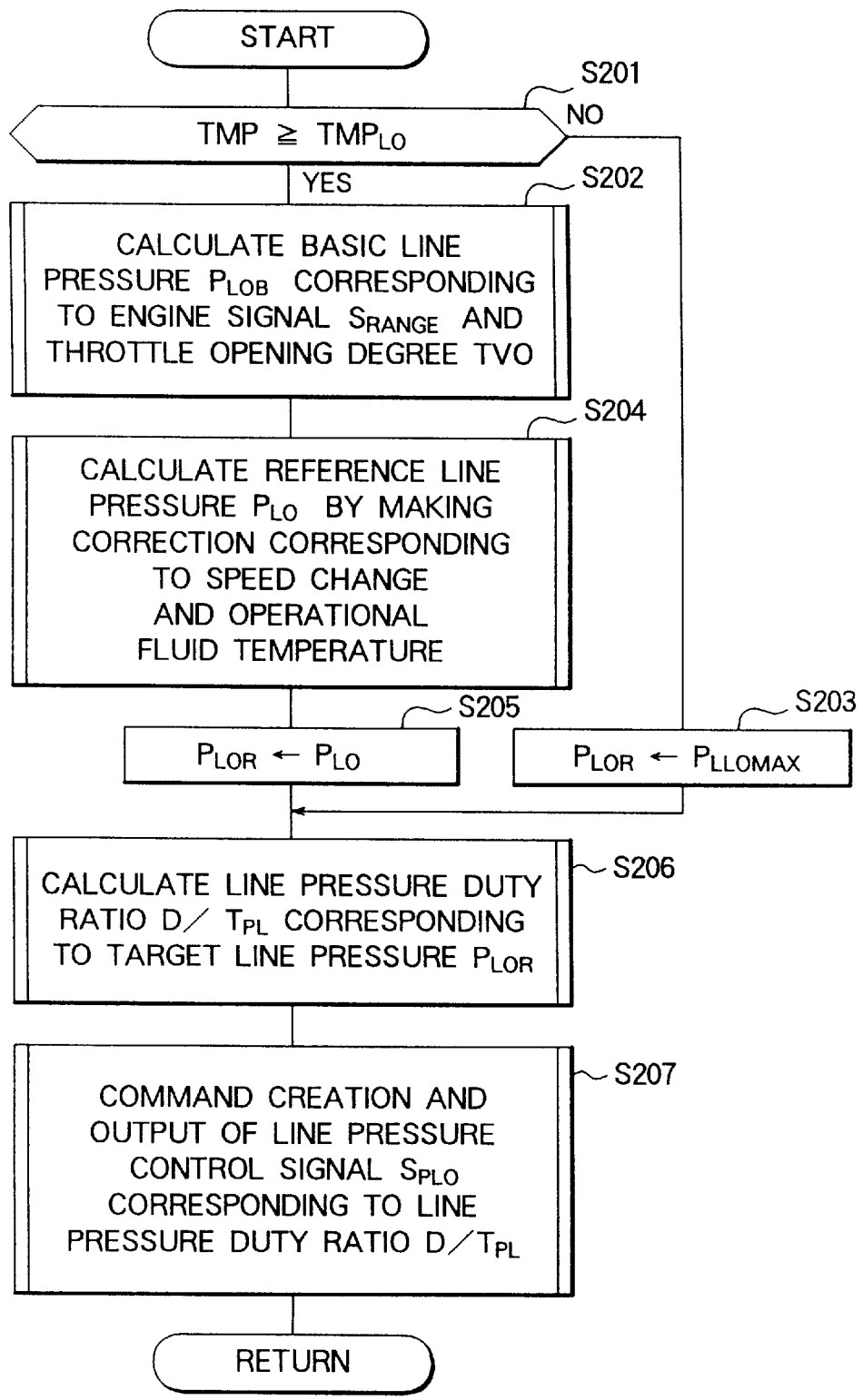
FIG. 7 is a flowchart showing an arithmetic processing executed as a minor program in the arithmetic processing of FIG. 4.

Next, in step S02, the control of the line pressure $P_L$ is performed in accordance with the arithmetic processing in FIG. 7.

Next, proceeding to step S03, a lock-up control is performed according to individual arithmetic processing. Specifically, for example, a lock-up vehicle speed VON and an unlock-up vehicle speed $V_{OFF}$ are set according to the vehicle speed $V_{SP}$ and the throttle opening-degree TVO, and the control signal $S_{L/U}$ is created and output so that, principally, the lock-up is achieved if the vehicle speed $V_{SP}$ is equal to or larger than the lock-up vehicle speed $V_{ON}$, and the unlock-up is achieved if equal to or lower than the unlock-up vehicle speed $V_{OFF}$. In particular, at the time of moving to the lock-up side, by entering temporally to a halt-clutch state, a shock is moderated at the time of moving to a complete lock-up.

Figures 5A, 5B:
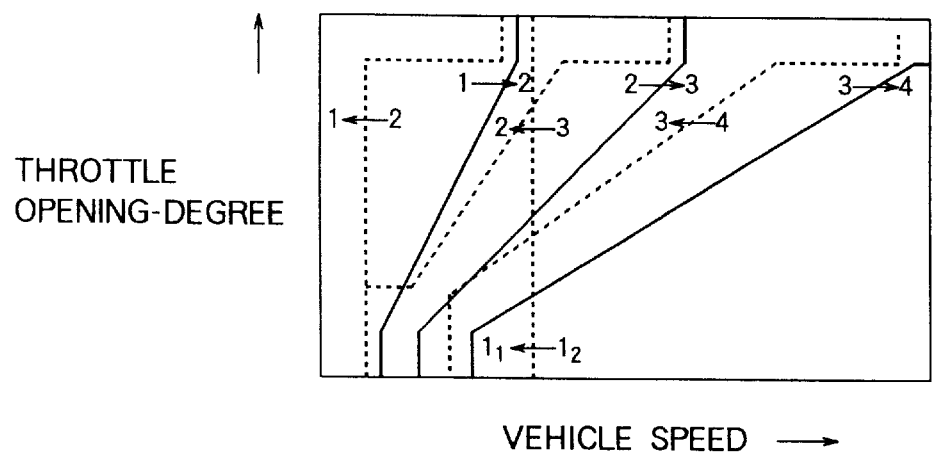
FIGS. 5a and 5b are explanation diagrams of a control map and a table used in an arithmetic processing of FIG. 4.

Next, proceeding to step S04, the transmission gear ratio control is performed according to an individual arithmetic processing such as a control map retrieval and the like. Specifically, an appropriate target transmission gear ratio is set from the vehicle speed $V_{SP}$ and throttle opening-degree TVO from a control map as shown in FIG. 5A, and an ON/OFF state of the two solenoids A21, B22 to achieve the target transmission gear ratio is obtained from a table shown in FIG. 5B, and the transmission gear ratio control signals $S_{SFT1}$, $S_{SFT2}$ are created and output so that the target transmission gear ratio can be achieved.

Figure 6:
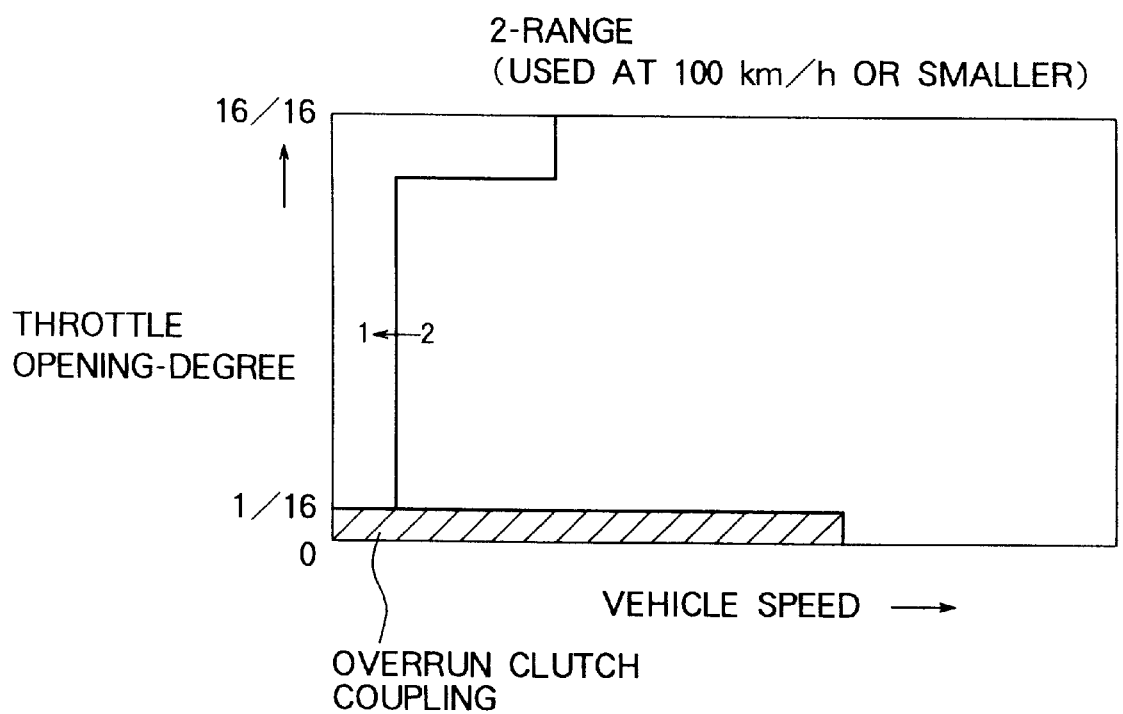
FIG. 6 is an explanation diagram of a control map used in an arithmetic processing of FIG. 4.

Next, proceeding to step S05, after performing the overrun clutch coupling control according to an individual arithmetic processing, returns to a main program. Specifically, the overrun clutch serves to transmit a reverse driving force from the driving wheels to the engine side, and basically, the overrun clutch is coupled and controlled when the engine brake such as the 2-range or the like other than the D-range is selected so that the engine brake acts efficiently to achieve a deceleration effect. As shown in FIG. 6, when the vehicle speed is equal to or lower than a predetermined value and the throttle opening-degree is equal to or lower than a predetermined value in the closing direction, the overrun clutch coupling control signal $S_{CL}$ for coupling the overrun clutch is created and output. In the L-range, it is designed to couple the overrun clutch in all the throttle opening-degree TVO region.

Next, with reference to FIG. 7, the arithmetic processing for line pressure control which is executed in step S02 in the arithmetic processing in FIG. 4 in this embodiment will be explained.

In this arithmetic processing, first, in step S201, it is judged whether the operational fluid temperature TMP is equal to or larger than a preset value $TMP_{LO}$ which is set to a low temperature, for example, at about 10° C., and when the operational fluid temperature TMP is equal to or higher than the low temperature predetermined value $TMP_{LO}$, proceeds to step S202, otherwise proceeds to step S203.

Figure 8A:
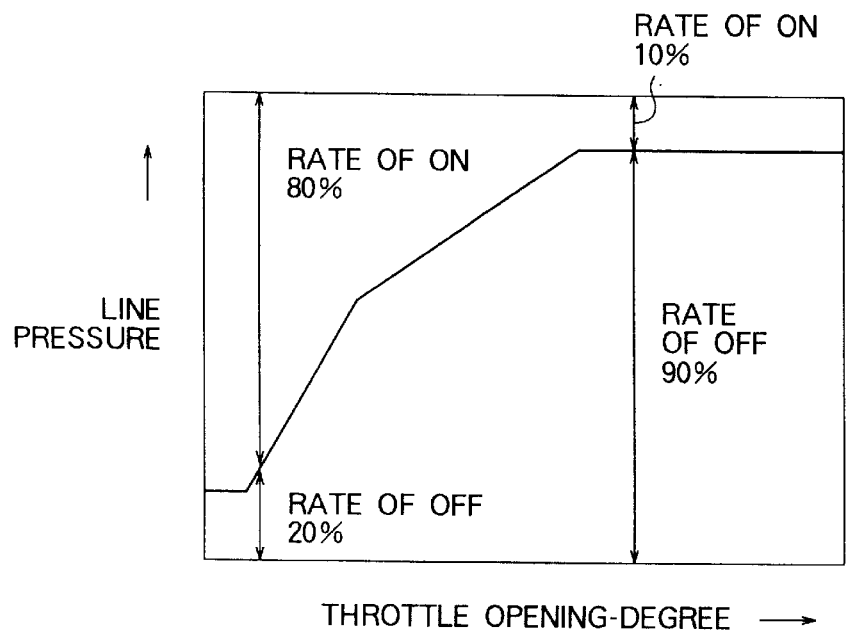
FIGS. 8a and 8b are explanation diagrams of a control map used in the arithmetic processing of FIG. 7.
Figure 8B:
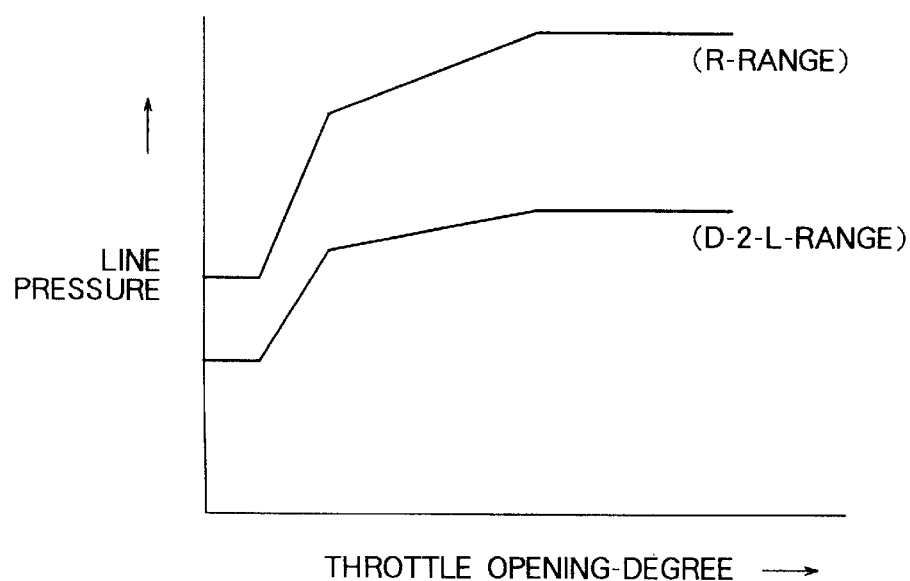

In the step S202, after calculating a shift range signal $S_{RANGE}$, and a basic line pressure $P_{LOB}$ corresponding to the throttle opening-degree TVO in accordance with an individual arithmetic processing, proceeds to step S204. Specifically, according to a throttle opening-degree TVO—line pressure $P_L$ curve as shown in FIG. 8A, the most basic line pressure $P_L$ is determined as the basic line pressure $P_{LOB}$. This basic line pressure $P_{LOB}$ represents, in principle, an operational fluid pressure required to sufficiently couple the friction element such as each clutch or the like with each other with respect to input torque from the engine 1, and also represents an operational fluid pressure which enables to reduce pump loss to a minimum extent. Therefore, for example, as shown in FIG. 8B, a required (basic) line pressure $P_{L(OB)}$ is different for the R-range from that for the D-, 2-, and L-ranges.

In the step S204, after calculating the basic line pressure $P_{LO}$ by making a correction to the basic line pressure $P_{LOB}$ depending on the speed change and operational fluid temperature, proceeds to step S205. Specifically, for example, at the time of change-over manipulation of each clutch during speed change, that is, at the time of change-over control or the shift solenoids A21, B22, in order to improve the speed change feeling such as reduction of speed change shock, the line pressure corrections are performed including the selection of a line pressure matched to the engine driving force and most suitable to the speed change by setting the line pressure to a slightly smaller level, and the setting of the line pressure to a slightly higher level in order to prevent degradation of the speed change shock (speed change feeling) due to an increase in viscosity of the operational fluid at a low temperature. The reference line pressure $P_{LO}$ is determined by reflecting the line pressure corrections.

In the step S205, after setting the reference line pressure $P_{LO}$ to the target line pressure $P_{LOB}$, proceeds to step S206.

On the other hand, in the step S203, a p reset high pressure (highest pressure), low temperature predetermined value $P_{LLOMAX}$ is set to a target line pressure $P_{LOR}$, proceeds to the step S206.

In order to achieve the target line pressure $P_{LOR}$ from an individual control map or the like not shown, a line pressure control duty ratio $D/T_{PL}$ is calculated and set, and proceeds to step S207. After commanding the creation and output of a line pressure control signal $S_{PL}$, corresponding to the line pressure control duty ratio $D/T_{PL}$, proceeds to step S9 of the arithmetic processing of FIG. 3. In this respect, as a control map of the line pressure control duty ratio $D/T_{PL}$ since already existing duty ratio control may be applied, its detailed explanation is omitted.

Figure 9:
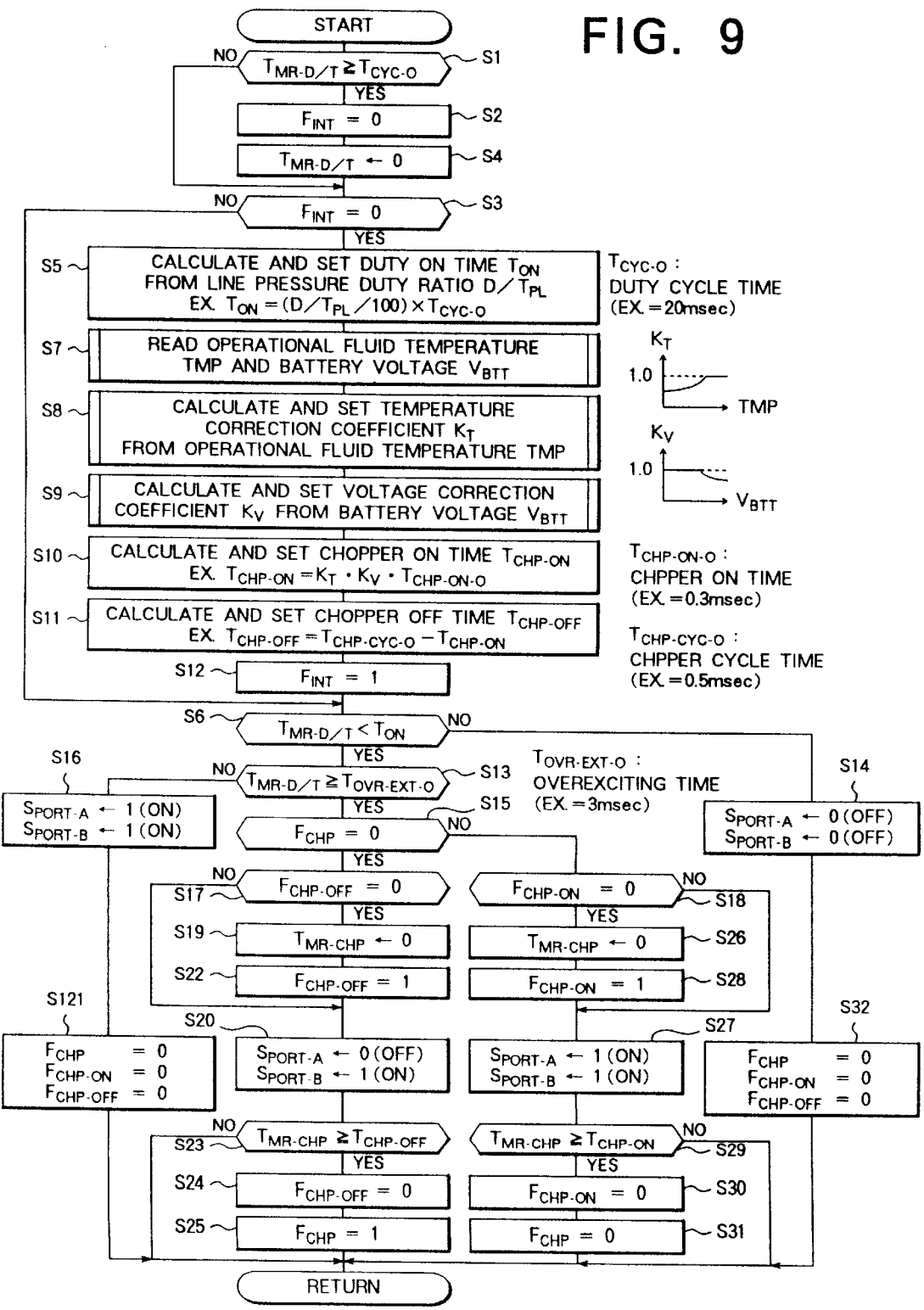
FIG. 9 is a flowchart showing an embodiment of an arithmetic processing of a line pressure solenoid executed in the control unit in FIG. 1.

With reference to FIG. 9, an arithmetic processing executed in the microcomputer within the A/T control unit 20 in order to create a line pressure control signal $S_{PL}$ corresponding to the line pressure control duty ratio $D/T_{PL}$ will be explained by using a flowchart. This arithmetic processing is driven under the command in step S207 in the arithmetic processing in FIG. 7, and it is executed as a timer interrupt at each predetermined sampling time (for example, 0.1 msec) $\Delta T$ which is far shorter than that in the arithmetic processing in FIG. 4. In this respect, in an arithmetic processing following this, any step is not provided for communication in particular, however, it is assumed that a program and a map required in an arithmetic processing unit within the microcomputer, or required data is read from the memory device at suitable time, and conversely, data calculated in the arithmetic processing unit is suitably updated and stored in the memory device. Furthermore, various kinds of timers used during the arithmetic processing is assumed to integrate a time separately from this arithmetic processing by using a clock signal used within the microcomputer.

Furthermore, in this embodiment, it is designed that the "on" voltage in the overexcitation and the "on" voltage in the chopping control have the same voltage value, and a current value during that period is made equivalent to that during application of a normal holding voltage. Also the time of the overexcitation is determined beforehand.

In this arithmetic processing, first, in step S1, it is judged whether a duty control timer $T_{MR-D/T}$ is equal to or larger than a duty cycle time $T_{CyC-O}$ which is preset, for example, to about 20 msec, and when the duty control timer $T_{MR-D/T}$ is equal to or larger than the duty cycle time $T_{CYC-O}$, proceeds to step S2, otherwise proceeds to step S3.

In the step S2, after resetting an initialization flag FINT to "0", proceeds to step S4, and after clearing the duty control timer $T_{MR-D/T}$ to "0", proceeds to the step S3.

In the step S3, it is judged whether the initialization flag $F_{INT}$ is in the reset state of "0", and when the initialization flag $F_{INT}$ is in the reset state, proceeds to step S5, otherwise proceeds to step S6.

In the step S5, after calculating a duty ON time $T_{ON}$ by multiplying the duty cycle time $T_{CYC-O}$ for example, by a percentage of the duty ratio $D/T_{PL}$ which is set in the step S206 in the arithmetic processing in FIG. 7, proceeds to step S7.

In the step S7, after reading an operational fluid temperature TMP from the operational fluid temperature sensor 9 and a battery voltage $V_{BTT}$ from the voltage sensor 18, proceeds to step S8.

Figure 10A:
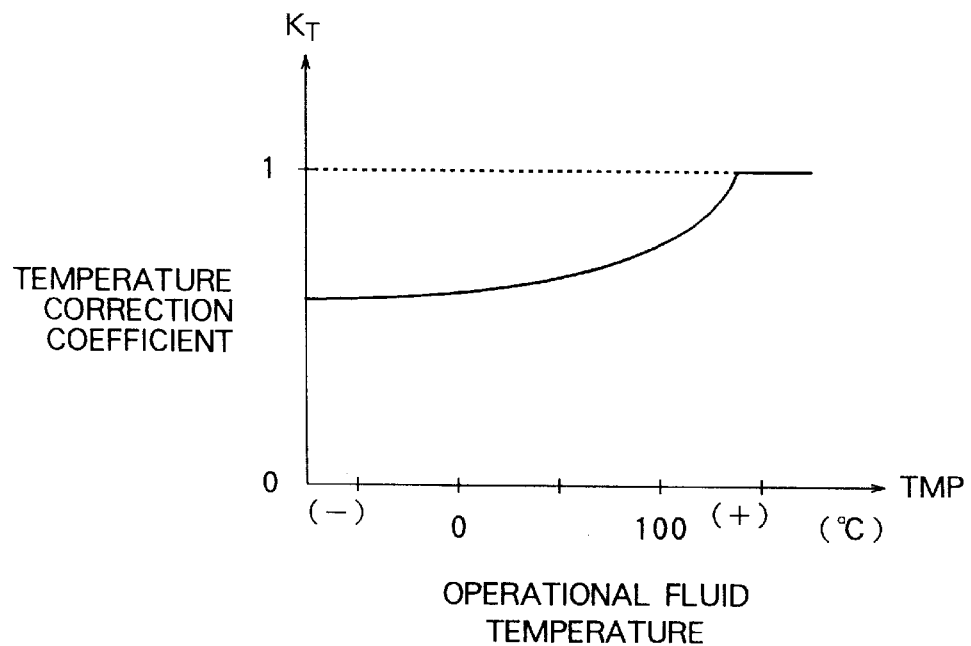
FIGS. 10a and 10b are explanation diagrams of a control map used in the arithmetic processing of FIG. 9.

In the step S8, after calculating a temperature correction coefficient $K_T$ from the operational fluid temperature TMP by an individual arithmetic processing not shown, proceeds to step S9. Specifically, the operational fluid temperature TMP is used as an operational environment temperature of the line pressure solenoid 5, and in accordance with the control map as shown, for example, in FIG. 10A, the temperature correction coefficient $K_T$ is obtained, which increases, in principle, as the operational fluid temperature TMP increases. In this control map, the temperature correction coefficient $K_T$ reaches "1" at a high temperature at which the operational fluid temperature TMP exceeds, for example, 120° C. However, in a region below this temperature, the lower the operational fluid temperature TMP, the smaller becomes the temperature correction coefficient $K_T$ while decreasing gradually the down-gradient toward a low temperature. This is because, as will be described later, that the lower the operational environment temperature, the smaller becomes the resistance value, that is, the inductance of the solenoid. In such a situation, the current value of a current flowing through the solenoid is increased, and heat generation and energy loss will be caused.

Figure 10B:
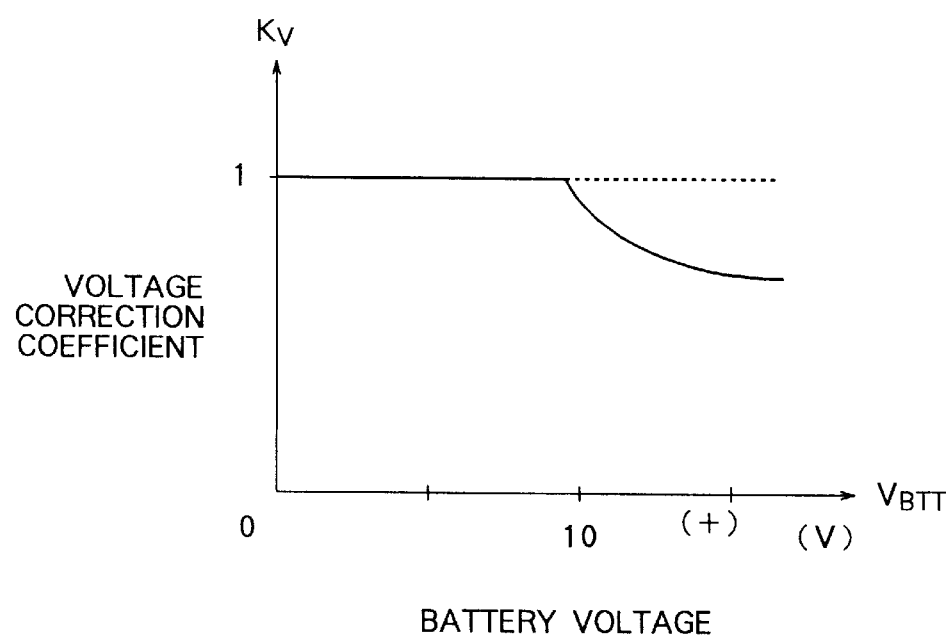

In the step S9, after calculating a voltage correction coefficient $K_V$ from the battery voltage $V_{BTT}$ by an individual arithmetic processing not shown, proceeds to step S10. Specifically, the battery voltage $V_{BTT}$ is used as a driving voltage of the line pressure solenoid 5, and in accordance with a control map, for example, as shown in FIG. 10B, the voltage correction coefficient $K_V$ is obtained, which decreases, in principle, as the battery voltage $V_{BTT}$ increases. In this control map, the voltage correction coefficient $K_V$ is "1" in a region where the battery voltage $V_{BTT}$, is smaller, for example, than 10 V, however, in a region above this voltage, the larger the battery voltage $V_{BTT}$, the smaller becomes the voltage correction coefficient $K_V$ whale decreasing a down-gradient toward a higher voltage. This is because, as will be described later, that even when the resistance value, that is, the inductance of the solenoid is constant, the larger the driving voltage of the solenoid, the larger becomes a current value of a current flowing through the solenoid, and heat generation and energy loss are caused. in the step S10, after calculating a chopper ON time by multiplying a reference chopper ON time $T_{CHP-ON-O}$ preset, for example, to about 0.3 msec by the temperature correction coefficient $K_T$ and the voltage correction coefficient $K_T$, and proceeds to step S11.

In the step S11, after calculating a chopper OFF time $T_{CHP-OFF}$ by reducing the chopper ON time $T_{CHO-ON}$ from a chopper cycle time $T_{CHO-SYS-O}$ preset, for example, to about 0.5 msec, proceeds to step S12.

In the step S12, after setting the initialization flag $F_{INT}$ to "1", proceeds to the above-mentioned step S6.

In the step S6, it is judged whether the duty control timer $T_{MR-D/T}$ is less than the duty ON time $T_{ON}$, and when the duty control timer $T_{MR-D/T}$ is less than the duty ON time $T_{ON}$, proceeds to step S13, otherwise proceeds to step S14.

In the step S14, after the A port control signal $S_{PORT-A}$ is made to enter an OFF state of a logical value "0", and at the same time, the B port control signal $S_{PORT-B}$ is made to enter an OFF state of a logical value "0", proceeds to step S32, and after resetting to "0", all the chopping control flag $F_{CHP}$ and the chopper ON control flag $F_{CHP-ON}$ and the chopper OFF control flag $F_{CHP-OFF}$, returns to the main program.

Furthermore, in the step S13, it is judged whether the duty control timer $T_{MR-D/T}$ is equal to or larger than an overexcitation time $T_{OVER-EXT-O}$ preset, for example, to about 3 msec, and when the duty control timer $T_{MR-D/T}$ is equal to or larger than the overexcitation time $T_{OVER-EXT-O}$, proceeds to step S15, otherwise proceeds to step S16, In the step S16, after making the A port control signal $S_{PORT-A}$ enter an ON state of a logical value "1" and making the B port control signal $S_{PORT-B}$ enter an ON state of a logical value "1", proceeds to step S21, and after resetting to "0", all the chopping control flag $F_{CHP}$ and the chopper ON control flag $F_{CHP-ON}$ and the chopper OFF control flag $F_{CHP-OFF}$, returns to the main program.

On the otherhand, in the step S15, it is judged whether the chopping control flag $F_{CHP}$ is in a reset state of "0", and when the chopping control flag $F_{CHP}$ is in the reset state, proceeds to step S17, otherwise proceeds to step S18.

In the step S17, it is judged whether the chopper OFF control flag $F_{CHP-OFF}$ is in a reset state of "0", and when the chopper OFF control flag $F_{CHP-OFF}$ is in the reset state of "0", proceeds to step S19, otherwise proceeds to step SS20.

In the step S19, after clearing the chopping control timer $T_{MR-CHP}$ to "0", proceeds to step S22, and after setting the chopper OFF control flag $F_{CHP-OFF}$ to "1", proceeds to the above-mentioned step 20.

In the step S20, the A port control signal SPORT-A is made to enter an OFF state of a logical value of "0", and at the same time, after making the B port control signal $S_{PORT-B}$ enter an ON state of a logical value of "1", proceeds to step S23.

In the step S23, it is judged whether the chopping control timer $T_{MR-CHP}$ is equal to or larger than the chopper OFF time $T_{CHO-OFF}$, and when the chopping control timer $T_{MR-CHP}$ is equal to or larger than the chopper OFF time $T_{CHO-OFF}$, proceeds to step S24, otherwise returns to the main program.

In the step S24, after resetting to "0" the chopper OFF control flag $T_{CHP-OFF}$, proceeds to step S25, and after setting to "1" the chopping control lag $F_{CNP}$, returns to the main program.

Furthermore, in the step S18, it is judged whether the chopper ON control flag $F_{CHP-ON}$ is in a reset state of "0", and when the chopper ON control flag $F_{CHP-ON}$ is in the reset state, proceeds to step S26, otherwise proceeds to step S27.

In the step S26, after clearing the chopping control timer $T_{MR-CHP}$, proceeds to step S28, and after setting to "1" the chopper ON control flag $F_{CHP-ON}$, proceeds to step S27.

In the step S27, after making the A port control signal $S_{PORT-A}$ enter an ON state of a logical value "1" and at the same time, making the B port control signal $S_{PORT-B}$ enter an ON state of a logical value "1", proceeds to step S29.

In the step S29, it is judged whether the chopping control timer $T_{MR-CHP}$ is equal to or larger than the chopper ON time $T_{CHP-ON}$, and when the chopping control timer $T_{MR-CHP}$ is equal to or larger than the chopper ON time $T_{CHP-ON}$, proceeds to step S30, otherwise returns to the main program.

In the step S30, after resetting to "0" the chopper ON control flag $F_{CHP-ON}$, proceeds to step S31, and after resetting to "0" the chopping control flag $F_{CNP}$, returns to the main program.

Next, the operation of the present embodiment will be described, however, since the outline of the speed change control is similar to the conventional one described in the Japanese Patent Laid Open Publication Hei No. 2-190666, here the description is omitted, and in particular, the operation or the line pressure control in the arithmetic processing in FIG. 7, and the operation to create and output a line pressure control signal in the arithmetic processing in FIG. 9 will be described in detail. First, in the arithmetic processing in FIG. 7, when the operational fluid temperature TMP is less than the low temperature predetermined value $T_{MPLO}$ which is about −10° C., since the viscosity of the operational fluid is high and a required line pressure cannot be obtained, the program proceeds to step S203 from step S201, and the (most) high pressure low temperature predetermined value $P_{LLOMAX}$ is set to a target line pressure $P_{LOR}$, otherwise, in principle, as described in the foregoing, in step S202, the amendment is made to the reference line pressure $P_{LO}$ according to the shift range signal $F_{RANGE}$ and the throttle opening-degree TVO, and also, in step S204, the amendment is made to the reference line pressure $P_{LO}$ according to the speed change and the temperature of the operational fluid, and the amended reference line pressure $P_{LO}$ is set to the target line pressure $P_{LOR}$ in step S205. When the target line pressure $P_{LOR}$ is set in this manner, the line pressure duty ratio $D/T_{PL}$ to achieve the target is set in step S206, and following this, the control command is output in step S207.

On the premise that the duty control timer $T_{MR-D/T}$ is cleared to "0" and the initialization flag $F_{INT}$ is reset to "0", when the line pressure duty ratio $D/T_{PL}$ is set as mentioned above, and thereafter when the arithmetic processing in FIG. 9 is executed, for the time being, the program proceeds to step S5 torm step S1 via step S3, and here, the duty ON time $T_{ON}$ corresponding to the line pressure duty ratio $D/T_{PL}$ is set. This duty ON time $T_{ON}$ represents a time during a cycle time of one duty control, at which time the line pressure solenoid 5 is made to enter an ON state, thus, in principle, it is obtained by multiplying the duty cycle time $T_{CYC-D/T-O}$ by a percentage of the line pressure duty ratio $D/T_{PL}$.

On the other hand, in the subsequent step S7, the operational fluid temperature TMP and the battery voltage VBTT are read, and in the next step S8, by regarding the operational fluid temperature TMP as the operational environment temperature of the line pressure solenoid 5, the temperature correction coefficient $K_T$ is calculated and set, and in the next step S9, by regarding the battery voltage $V_{BTT}$ as the solenoid driving voltage, the voltage correction coefficient $K_V$ is calculated and set, and the chopper ON time $T_{CHP-ON}$ is calculated by multiplying a reference chopper ON time $T_{CHP-ON-O}$ preset to about 0.3 msec by the voltage correction coefficient $K_V$. Also, in the next step S10, The copper OFF time $T_{VHP-OFF}$ is calculated by reducing the chopper ON time $T_{CHP-ON}$ from the chopper cycle time $T_{CHP-CYC-O}$ preset to about 0.5 msec. As will be described in detail later, a current value $i_{SOL}$ supplied to the line pressure solenoid 5 during the duty ON time $T_{ON}$ is, similar to the normal duty control, only required to meet the condition that the current value is equal to or larger than a predetermined current value $i_{LO}$ corresponding to the line pressure duty ratio $D/T_{PL}$. And, if the current value is larger than that, it is only increases the the amount of generated heat and the energy loss. Furthermore, if the amount of generated heat increases too high, a heat shielding mechanism will be needed to prevent the influence on other equipment, and the structure becomes complicated and the cost will be increased.

In order to suppress and avoid this, it is only required to reduce when the current value $i_{SOL}$ supplied to the line pressure solenoid 5 is too large. To this end, since it is only required to reduce the solenoid ON time during duty ON time $T_{ON}$, for example, when the chopper cycle time during the chopping drive is constant, the chopper ON time may be reduced, and for example, when the chopper ON time during one chopper cycle is constant, chopper cycle time may be increased, and in the present embodiment, the former is adopted.

Furthermore, the factors for increasing the supply current value $i_{SOl}$ to the line pressure solenoid 5 are divided into two kinds according to the formula: (voltage value)=(current value)×(resistance value), one kind of factor is that the driving voltage is large when the resistance value or the solenoid is constant, and the other kind of factor is that the resistance value of the solenoid is small when the driving voltage is constant. Furthermore, generally, the resistance value of the solenoid is smaller as the operational environmental temperature is smaller. Thus, in the step S8, a smaller temperature correction coefficient $K_T$ is set, as the operational fluid temperature TMP which is the operational environmental temperature of the line pressure solenoid 5 is smaller. In the subsequent step S9, the larger the battery voltage $V_{BTT}$ which is the driving voltage or the line pressure solenoid 5, the smaller voltage correction coefficient $K_V$ is set. Since a chopper ON time $T_{CHP-ON}$ is calculated by multiplying the reference chopper ON time $T_{CHO-ON-O}$ by the coefficients $K_T$ and $K_V$, and since a chopper OFF time TCHP-OFF is calculated by reducing the chopper ON time $T_{CHP-ON}$ from the constant chopper cycle time $T_{CHP-CYC-O}$, the chopper ON time becomes shorter in a condition where the supply current value $i_{SOL}$ to the line pressure solenoid 5 is considered to increase. Thus, since the chopper OFF time become relatively long, it is possible to reduce the supply current value $i_{SOL}$ actually supplied to the line pressure solenoid 5.

In this manner, when the chopper OFF time $T_{CHP-OFF}$ and the chopper ON time $T_{CHP-ON}$ are set, in the next step S12, an initialization flag $F_{INT}$ is set. Thus, thereafter, an accumulated duty control timer $T_{MR-D/T}$ becomes equal to or larger than the duty cycle time $T_{CYC-O}$, and as a result, so long as a flow to proceed from step S1 to step S2 is not executed, the initialization flag $F_{INT}$ is not reset. Therefore, thereafter, the chopper ON time $T_{CHP-ON}$ and the chopper OFF time $T_{CHP-OFF}$ are maintained until the next duty cycle.

Hereinafter, with reference to a timing chart of FIG. 11, the operation of the arithmetic processing in FIG. 9 will be explained. Here, in the timing chart, a solenoid driving voltage and a solenoid supply current as the line pressure control signal $S_{PL}$ are simulated under a condition wherein the operational fluid temperature TMP is sufficiently high and/or the battery voltage is rather low. Thus, the chopper ON time $T_{CHP-ON}$ is set to relatively long, and the chopper OFF time $T_{CHP-OFF}$ is set to relatively short.

As described in the foregoing, when the initialization of the chopping drive is performed, and when the program proceeds to step S6 under a state of "0" of the duty control timer $T_{MR-D/T}$, since the duty control timer $T_{MR-D/T}$ is naturally less than the duty ON time $T_{ON}$, proceeds to step S13, however, since the duty control timer $T_{MR-D/T}$ is less than the overexciting time $T_{OVE-EXT-O}$, proceeds to step S16. Thereafter, since both the B port control signal $S_{PORT-B}$ and A port control signal $S_{PORT-A}$ enter an ON state of a logical value of "1", the line pressure solenoid 5 is maintained in an ON state. During this time, the solenoid supply current value $1_{SOL}$ exceeds a predetermined current value $i_{LO}$ corresponding to the line pressure duty ratio D/$T_{PL}$ to a great extent, and the supply current value $i_{SOL}$ of the line pressure solenoid 5 rises quickly.

In the meanwhile, when the duty control timer $T_{MR-D/T}$ becomes equal to or larger than the overexcitation time $T_{OVR-EXT-O}$, the program proceeds to step S15 from step S13. At this time point, since the chopping control flag $F_{CHP}$ remains reset, proceeds to step S17. Since the chopper OFF control flag $F_{CHP-OFF}$ also remains still reset, proceeds to step S19, and after clearing the chopping control timer $T_{MR-CHP}$, and after setting the chopper OFF control flag $F_{CHP-OFF}$ in step S22, proceeds to step S20. Accordingly, so long as an accumulated chopping control timer $T_{MR-CHP}$ becomes equal to or larger than the chopper OFF time $T_{CHP-OFF}$, and then so long as the chopper OFF control flag FCHP-OFF is not reset in step S24, a flow in which the program jumps from step S17 to step S20 is repeated from the next sampling time, and during this period of time, the chopping control timer $T_{MR-CHP}$ is accumulated continuously. In the above-mentioned step S20, since the A port control signal $S_{PORT-A}$ remains in the OFF state of logical value of "0", and the B port control signal $S_{PORT-B}$ remains in the ON state of logical value of "1", during this period of time, the line pressure solenoid 5 is maintained in the OFF state while allowing the reflex current. Thus, the solenoid driving voltage value $V_{SOL}$ is simply drops in a rectangular wave shape, and the solenoid supply current value $i_{SOL}$ is decreased gradually.

This operation is repeated for the relatively short chopper OFF time $T_{CHP-OFF}$ or longer, and in the meantime when the accumulated chopping control timer $T_{MR-CHP}$ becomes equal to or larger than the chopper OFF time $T_{CHP-OFF}$, proceeds to step S24 from step S23, and after resetting the chopper OFF control flag $F_{CHP-OFF}$, in step S25, sets the chopping control flag $F_{CHP}$. Thus, in the next program cycle, proceeds to step S18 from step S15. At this time point, since the chopper ON control flag $F_{CHP-ON}$ is still reset, proceeds to step S26, and here after clearing the chopping control timer $T_{MR-CHP}$, the chopper ON control flag $F_{CHP-ON}$ is set in step S28, and then proceeds to step S27. Accordingly, the accumulated chopping control timer $T_{MR-CHP}$ becomes equal to or larger than the chopper ON time $T_{CHP-ON}$, and so long as the chopper ON control flag FCHP-ON is not reset an the next step S30, from the next program cycle, a flow including the jumping from step S18 to step S27 is repeated, and during this period of time, the chopping control timer $T_{MR-CHP}$ which has been once cleared is continuously accumulated. Furthermore, in the step 27, since both the A port control signal $S_{PORT-A}$ and the B port control signal $S_{PORT-B}$ remain in the ON state of logical value of "1", during this period of time, the line pressure solenoid 5 is maintained in the ON state, so that the solenoid driving voltage value $V_{SOL}$ simply rises in a rectangular wave shape, and the solenoid supply current $i_{SOL}$ is gradually increased.

This operation is repeated for the relatively long chopper ON time $T_{CHP-ON}$ or longer, and in the meantime, when the accumulated chopping control timer $T_{MR-CHP}$ becomes equal to or larger than the chopper ON time $T_{CHP-ON}$, proceeds to step S30 from step S29, and after resetting the chopper ON control flag $F_{CHP-ON}$, in step S31, chopping control flag FCHP is set. Thus, from the next program cycle, proceeds again to step S17 from step S15. In other words, hereafter, in a flow in the step S17 and subsequent thereto, during the relatively short chopper OFF time $T_{CHP-OFF}$, the line pressure solenoid 5 is made in an OFF state allowing the reflex current, and in a flow in the step S18 and subsequent thereto, during the relatively long chopper ON time $T_{CHP-ON}$, the line pressure solenoid 5 is made ON state. The chopping drive is continued by repeating the OFF state and the ON state. In the present embodiment, it is designed such that the solenoid supply current $i_{SOL}$ becomes small as a whole by the chopper ON time $T_{CHP-ON}$ and the chopper OFF time $T_{CHP-OFF}$ which are set by the operational fluid temperature TMP and the battery voltage $V_{BTT}$, however, it is also designed that the solenoid supply current $1_{SOL}$ is not reduced less than the predetermined current value $i_{LO}$ corresponding to the line pressure duty ratio $D/T_{PL}$. As a requirement, it is designed that the gradually reducing solenoid supply current $1_{SOL}$ becomes a small current value as small as possible equal to or larger than the predetermined current value $i_{LO}$.

In the meantime, when the continuously accumulated duty control timer $T_{MR-D/T}$ becomes equal to or larger than the duty ON time $T_{ON}$, a flow wherein the program proceeds to step S14 from step S6 is repeated. Thus, both the the A port control signal $S_{PORT-A}$ and the B port control signal $S_{PORT-B}$ enter an OFF state of logical value of "0", and the line pressure solenoid 5 is maintained in the OFF state which does not allow the reflex current. In particular, just after the entering this OFF state, after elapsing the duty ON time $T_{ON}$ from the start of the overexcitation control, the clamp is generated in the line pressure solenoid 5 as described in the foregoing, and due to this clamp, a rapid backward potential difference is generated in the solenoid driving voltage $V_{SOL}$, and the solenoid supply current value iSOL is quickly reduced due to a backward current generated by the rapid backward potential difference, and thereafter, the solenoid supply current value $i_{SOL}$ is reduced to "0".

In the meantime, when the duty control timer $T_{MR-D/T}$ which as accumulated continuously becomes equal to or larger than the duty cycle time $T_{SYS-O}$, proceeds to step S2 from step S1, and the initialization flag $F_{INT}$ is reset, and then the duty control timer $T_{MR-D/T}$ is cleared in step S4. Accordingly, hereafter, a control signal $S_{PL}$ corresponding to the line voltage duty ratio $D/T_{PL}$ is created and output similarly to the foregoing.

In this series of control signals $S_{PL}$, as described in the foregoing, the duty ON time $T_{ON}$ is variable according to the line voltage duty ratio $D/T_{PL}$, however, the duty cycle time $T_{CYC-O}$ is constant, and also the overexcitation time $T_{OVR-EXT-O}$ and each chopper cycle time $T_{CHP-CYC-O}$ are constant. On the other hand, in this simulation, because the battery voltage $V_{BTT}$ is small, the operational fluid temperature TMP is high, that is, since the resistance value as large, the solenoid supply current value $i_{SOL}$ in the overexcitation time $T_{OVER-EXT-O}$ is relatively small. However, since the chopper ON time $T_{CHP-ON}$ which is set by the temperature correction coefficient $K_V$ and the voltage correction coefficient $K_V$ as long, and relatively the chopper OFF time $T_{CHP-OFF}$ is short, it is possible to reduce the amount of decrease and to increase the amount of increase in the solenoid supply current value iSOL at the time of chopper OFF during the chopper driving, the ultimate solenoid supply current value $i_{SOL}$ can be held at a predetermined current value $1_{LO}$ or higher corresponding to the line pressure duty ratio $D/T_{PL}$, and also it is possible to make the current value as small as possible.

Next, with reference to a timing chart in FIG. 12, the operation of the arithmetic processing in FIG. 9 will be explained, wherein in the timing chart, the solenoid driving voltage value and the solenoid supply current value as the line pressure control signal $S_{PL}$ are simulated under a condition in which the operational fluid temperature TMP is relatively small and/or the battery voltage $V_{BTT}$ is sufficiently large. In this case, since the temperature correction coefficient $K_V$ and the voltage correction coefficient $K_V$ which are set in the step S8 and step S9 are large, the chopper ON time $T_{CHP-ON}$ which are set in the step S10 and step S11 is relatively short, and in contrast, the chopper OFF time $T_{CHP-OFP}$ is relatively long. In this respect, the line pressure duty ratio $D/T_{PL}$ and the duty ON time $T_{ON}$ are made to be equivalent to the simulation in FIG. 11.

Figure 11:
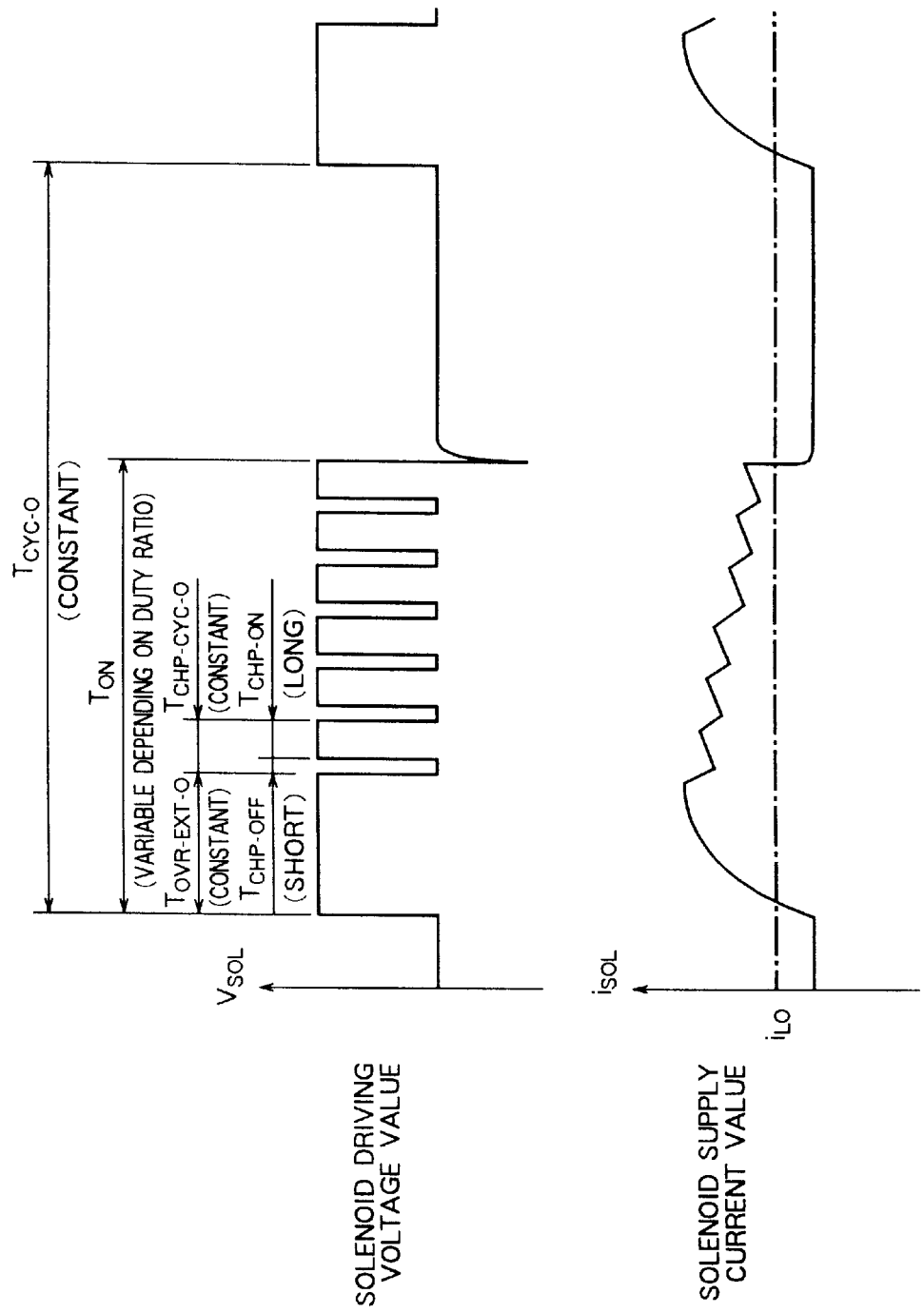
FIG. 11 is an explanation diagram showing an example of a line presure solenoid control signal delivered in the arithmetic processing of FIG. 9.

In this simulation, since the battery voltage $V_{BTT}$ is large, and the operational fluid temperature TMP is low, that as, since the resistance value is small, the solenoid supply current value $1_{SOL}$ at the overexcitation time $T_{OVR-EXT-O}$ is large as compared with that in the simulation in FIG. 11 shown by a broken line. However, a required time for the solenoid supply current value $1_{SOL}$ to reach a predetermined current value $i_{LO}$ or larger corresponding to the line pressure duty ratio $D/T_{PL}$ and for the solenoid to enter an ON state, is not so changed as compared with the simulation in FIG. 11, that is, there is no change in the response property of the rise.

However, since the chopper ON time $T_{CHP-ON}$ which is set by the temperature correction coefficient $K_T$ and the voltage correction coefficient $K_V$ is short, and in contrast the chopper OFF time $T_{CHP-OFF}$ as long, it is possible to increase the amount of decrease and to reduce the amount of increase in the solenoid supply current value $i_{SOL}$ at the time of chopper OFF during the chopper driving, the ultimate solenoid supply current value $i_{SOL}$ can be made to be a small current value equal to a predetermined current value $i_{LO}$ or larger corresponding to the line pressure duty ratio $D/T_{PL}$.

Figure 12:
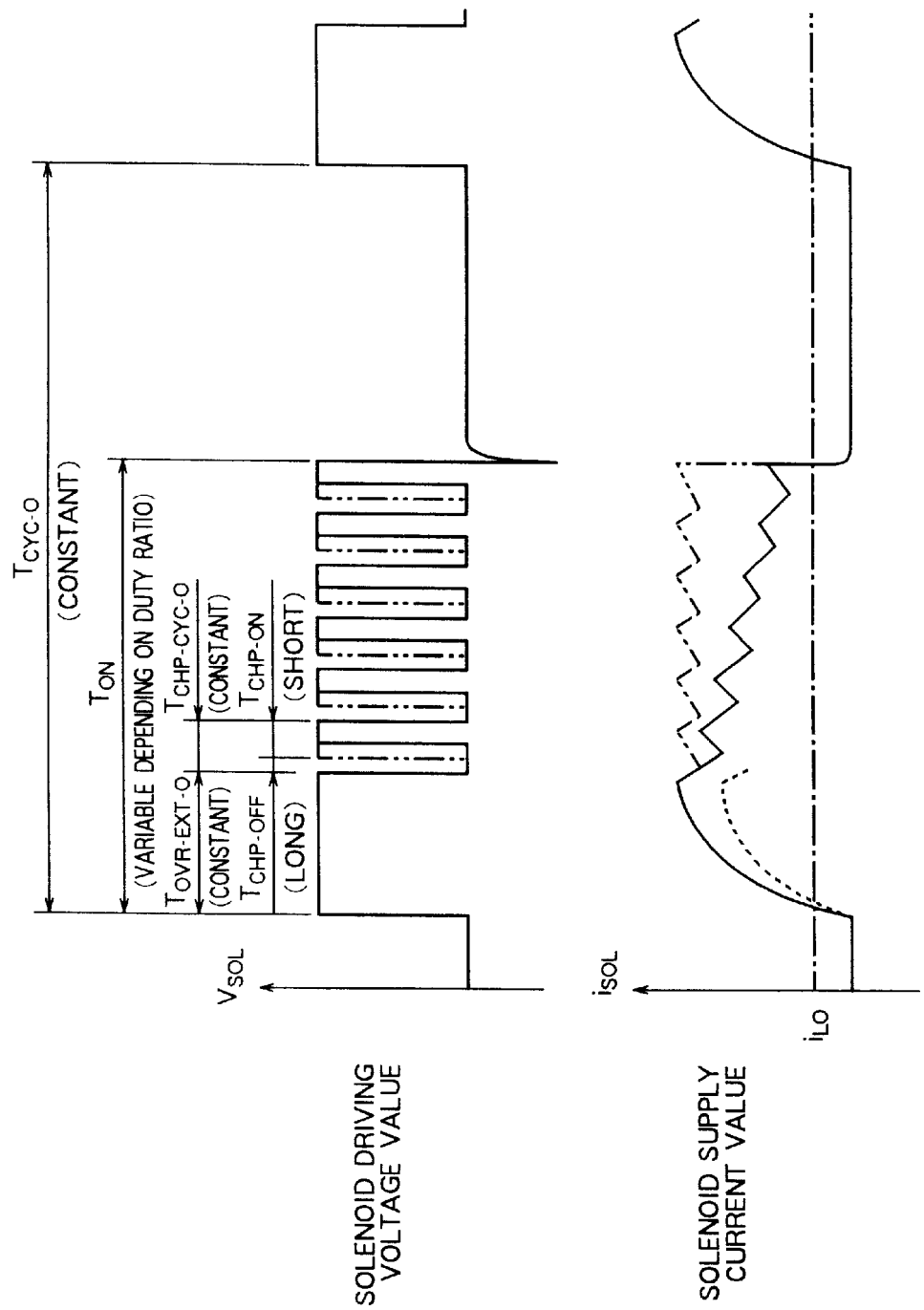
FIG. 12 is an explanation diagram showing an example of a line presure solenoid control signal delivered in the arithmetic processing of FIG. 9.

In contrast, as shown by a two-dotted chain line in FIG. 12, assuming that the chopper ON time $T_{CHP-ON}$ and the chopper OFF time $T_{CHP-OFF}$ equivalent to the simulation in FIG. 11 are used, in this case, since the amount of decrease is reduced and the amount of increase is increased in the solenoid supply current value $i_{SOL}$ at the time of chopper OFF during the chopper driving, as shown similarly by the two-dotted chain line in FIG. 12, there is a possibility that the solenoid supply current value $i_{SOL}$ becomes a large current value larger to a great extent than the predetermined current value $i_{LO}$ corresponding to the line pressure duty ratio $D/T_{PL}$. The difference between the above-mentioned two current values is just the energy loss, and since this is exhibited as the amount of generated heat, in some cases, a heat shielding mechanism will be necessary to insulate equipment from the damage, and this will result in the complication of structure and the high cost.

Therefore, according to the solenoid driving control apparatus which is a development of the operational fluid control apparatus of the automatic transmission in the present embodiment, the solenoid supply current value $i_{SOL}$ is detected indirectly, for example, from the battery voltage $V_{STT}$ and the operational fluid temperature TMP, and the larger the solenoid supply current value $i_{SOL}$, the shorter the chopper ON time $T_{CHP-ON}$ is made so that the solenoid supply current value $i_{SOL}$ becomes a small current value equal to or larger than the predetermined current value $i_{LO}$ corresponding to the duty ratio $D/T_{PL}$. As a result, it is possible to simplify the structure and to reduce the cost by reducing the energy loss and the amount of generated heat.

According to the above description, the voltage sensor 18 and the step S7 in the arithmetic processing in FIG. 9 constitute supply current value detecting means and supply voltage value detecting means and electrical operational environment detecting means in the present invention, and similarly, the temperature sensor 9 and the step S7 in the arithmetic processing in FIG. 9 constitute resistance value detecting means and electrical operational environment detecting means and operational environment temperature detecting means, and from the step 8 to step 11 in the arithmetic processing in FIG. 9 constitute correction means.

Furthermore, as described above, in order to reduce the supply current value to the solenoid, for example, when the chopper ON time is constant, the chopper cycle time is increased. That is, since it is only required to reduce the frequency of the chopping control, the object of the correction may be the chopper cycle time. Also, both may be used simultaneously.

Furthermore, in the above embodiment, although the operational fluid temperature is detected as the operational environment temperature in order to indirectly detect the resistance value of the solenoid, if it is possible to directly detect the resistance value of the solenoid, a current value may be estimated by using the resistance value. Of course, if the supply current value of the solenoid can be monitored directly, the correction may be made by using the supply current value.

Second Embodiment

Next, a second embodiment or the present invention will be explained. In this embodiment, in place of the chopping control in the first embodiment, a constant holding voltage which is lower than the overexciting voltage is applied, and the time of overexcitation is changed depending on various electrical variables.

Figure 3:
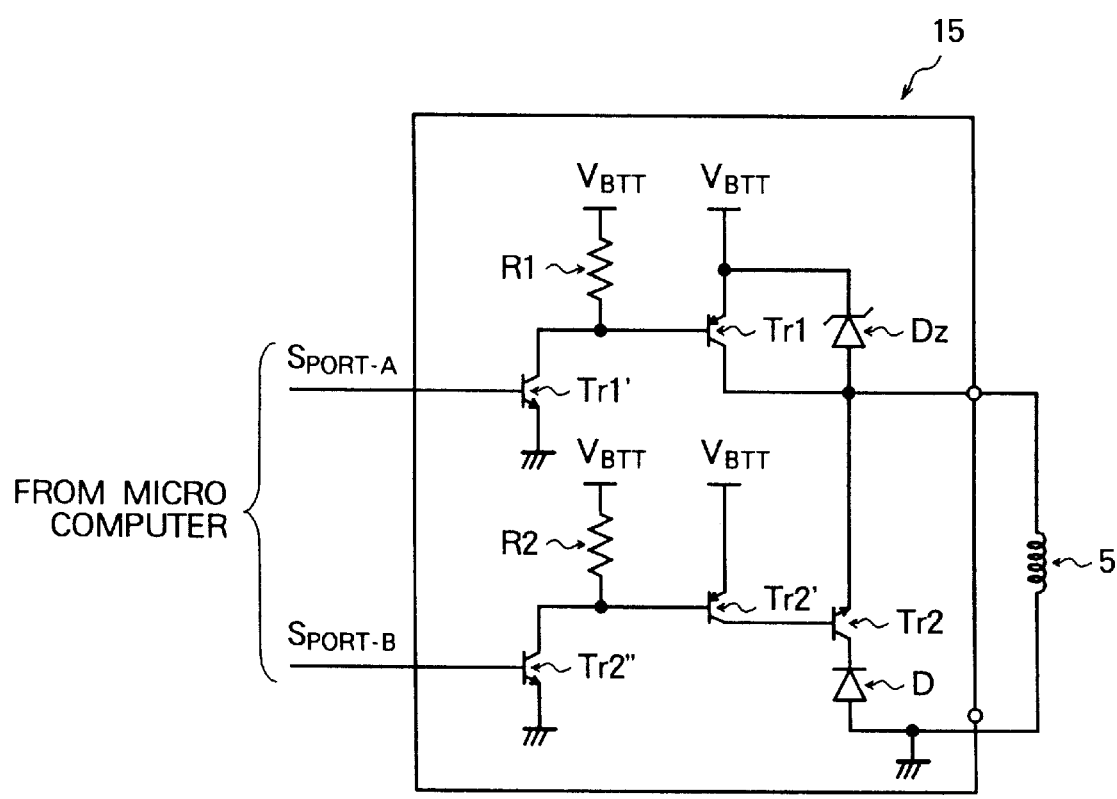
FIG. 3 is an explanation diagram of a line pressure solenoid.
Figure 13:
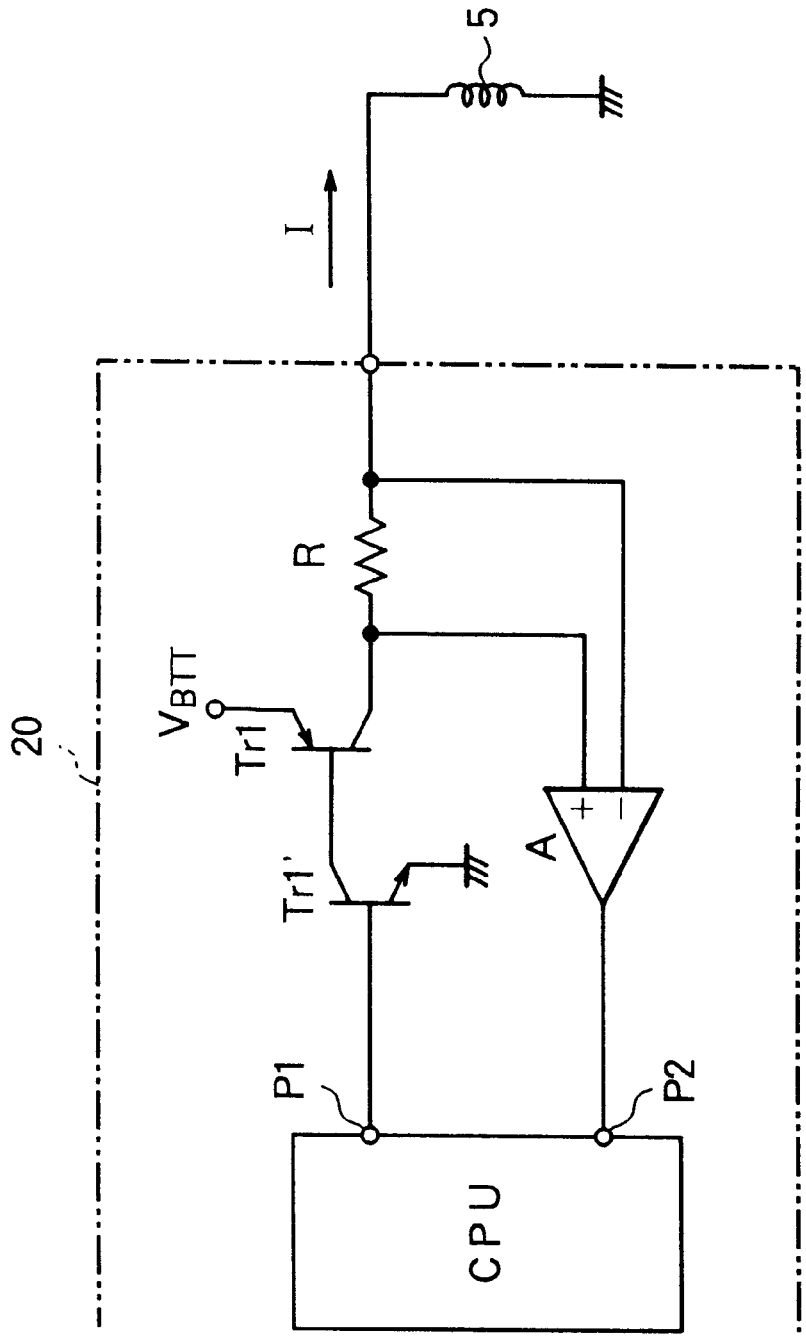
FIG. 13 is a diagram of a circuit arrangement of a second embodiment of the present invention.

FIG. 13 is a diagram for explanation of a line pressure solenoid driving circuit portion in the present embodiment in place of FIG. 3 in the first embodiment. A line pressure to be supplied to the automatic transmission is calculated by a CPU (the same as the microcomputer in first embodiment), and the line pressure is converted into a duty ratio of the line pressure solenoid 5, and a control signal for controlling the duty ratio of the line pressure solenoid 5 is output from an I/O port $P_1$. By the switching operation of transistors Tr1 and Tr1' based on the control signal, the duty ratio of the line pressure solenoid 5 is controlled. The letter R denotes a resistor for current detection, and a voltage across the resistor R is amplified by a differential amplifier A, and then input to an AD port $P_2$, and a driving current 1 of the line pressure solenoid 5 is detected on the basis of a digital value obtained by converting the detected voltage into the digital value. The CPU includes current detecting means for detecting the driving current I, predicting means for predicting a terminating time of overexcitation on the basis of the detected result as will be described later, and control means for terminating the overexcitation at the terminating time.

Figure 14:
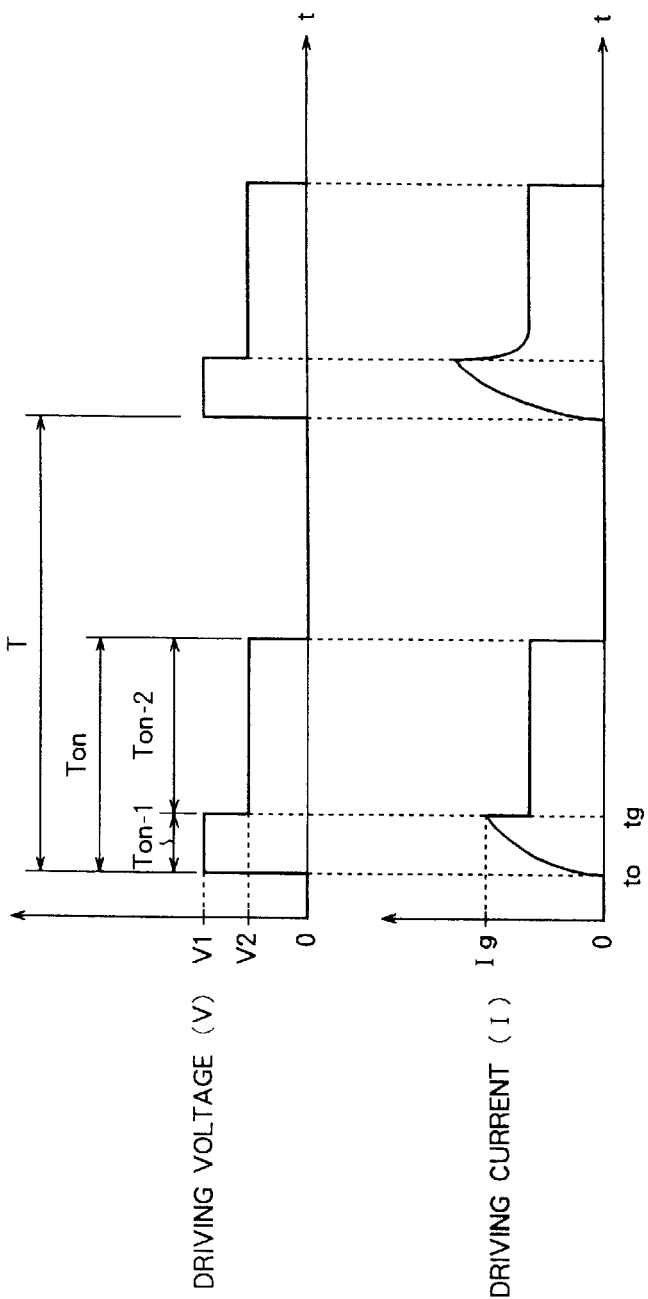
FIG. 14A is an explanation diagram of a driving voltage applied to the solenoid.
FIG. 14B is an explanation diagram of a driving current at the tame of application of the driving voltage of FIG. 14A.

FIGS. 14A and 14B are diagrams for explaining a driving voltage V and a driving current I during duty control of the line pressure solenoid 5, and for example, a minor program executed in step S207 in the arithmetic processing in FIG. 7 in the first embodiment is schematized. In these diagrams, the letter T denotes a duty period (for example, 20 msec), and $T_{ON}$ denotes an on time. The on time includes an overexcitation time $T_{on\text{-}1}$ for overexciting the line pressure solenoid 5 by applying an overexciting voltage $V_1$ (for example, 12 V), and a holding time $T_{on\text{-}2}$ for applying a holding voltage $V_2$ ($<V_1$) after the overexcitation. A termination time point $t_g$ of the overexcitation time $T_{on\text{-}1}$ is a time point at which a driving current I, that is, an overexciting current rises to a target overexciting current $I_g$ as shown in FIG. 14B. The target overexciting current $I_g$ is a minimum current required for a plunger of the line pressure solenoid 5 to start moving, and the overexcitation is terminated at the time point $t_g$ when the current reaches the target overexciting current $I_g$. The termination time point $t_g$ of the overexcitation is predicted from detection results of the overexciting current at least at two time points.

Figure 15:
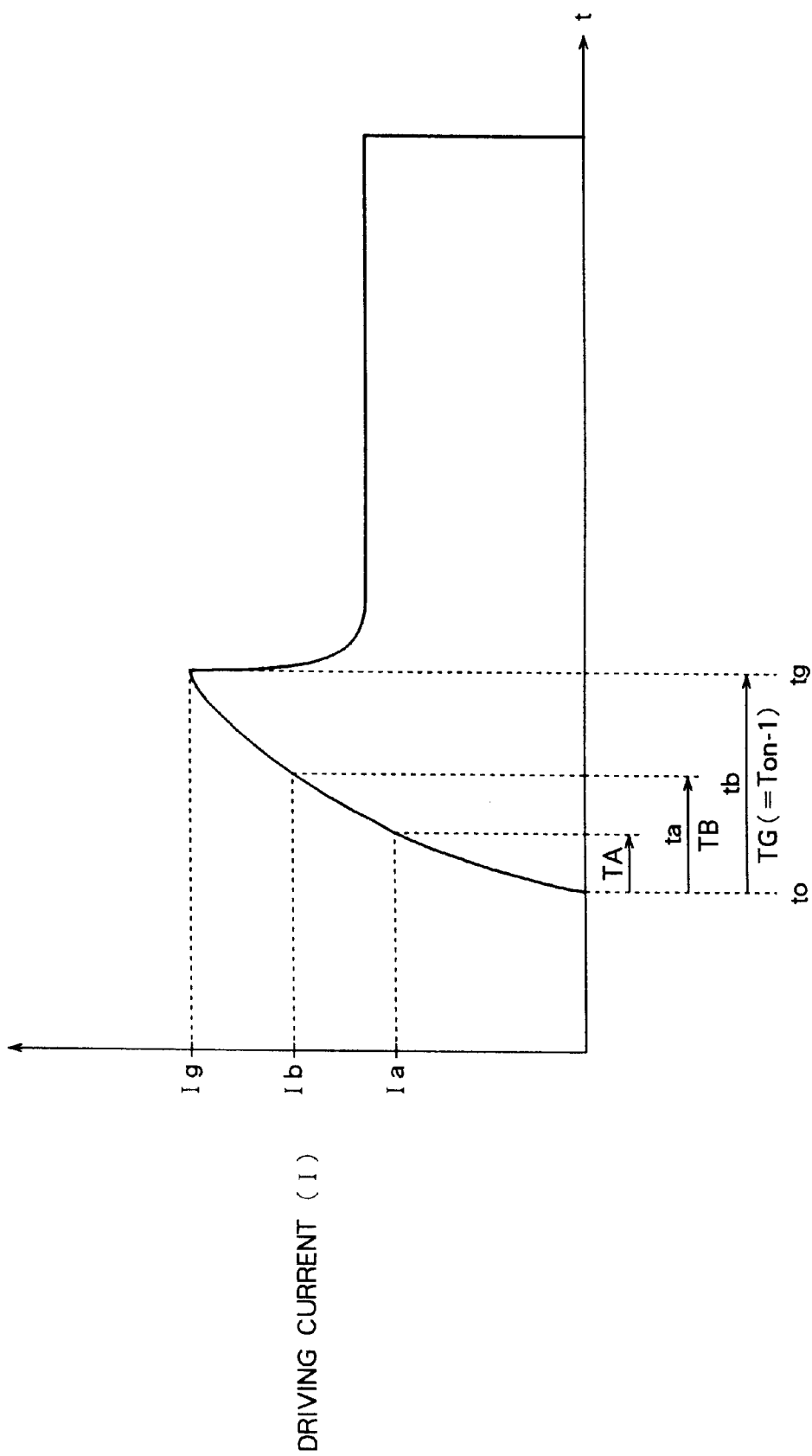
FIG. 15 is an enlarged explanation diagram of FIG. 14B.

FIG. 15 is a diagram for explaining a prediction example of the termination time point $t_g$ of the overexcitation. In this example, overexciting currents $I_a$ and $I_b$ are detected at two time points $t_a$ ans $t_b$ at which predetermined times $T_A$ and $T_B$ are respectively elapsed from the rising time $t_o$ of the overexciting current. Here, the driving circuit of the line pressure solenoid 5 can be considered as a R-L series circuit, and a current 1 in a transient phenomenon of the R-L series circuit is given by the following equation (1):

$$i = \frac{V}{R}\left(1 - e^{-\frac{R}{L}t}\right) \qquad (1)$$

A change curve of the overexciting current is assumed from the overexciting currents $I_a$ and $I_b$ detected at the time points $t_a$ ans $t_b$, and an overexcitation time $T_G$, that is, a time until the overexciting current reaches the target overexciting current $I_G$ at the time point $t_g$ is predicted by inverse calculation of the equation (1). That is, in the equation (1), since the voltage V varies due to the tact that it is a battery voltage of the vehicle, and since the resistance R varies depending on the ambient temperature, the voltage V and the resistance R can be specified from at least two time points $t_a$ and $t_b$, and two times $T_A$ and $T_B$. As a result, the time point $t_g$ at which the overexciting current reaches the target overexciting current $I_g$ can be predicted. The microcomputer (CPU) terminates the overexcitation at the time point $t_g$ predicted in this manner, and changes the applied voltage to the line pressure solenoid 5 to a holding voltage $V_2$.

Third Embodiment

Figures 16A, 16B:
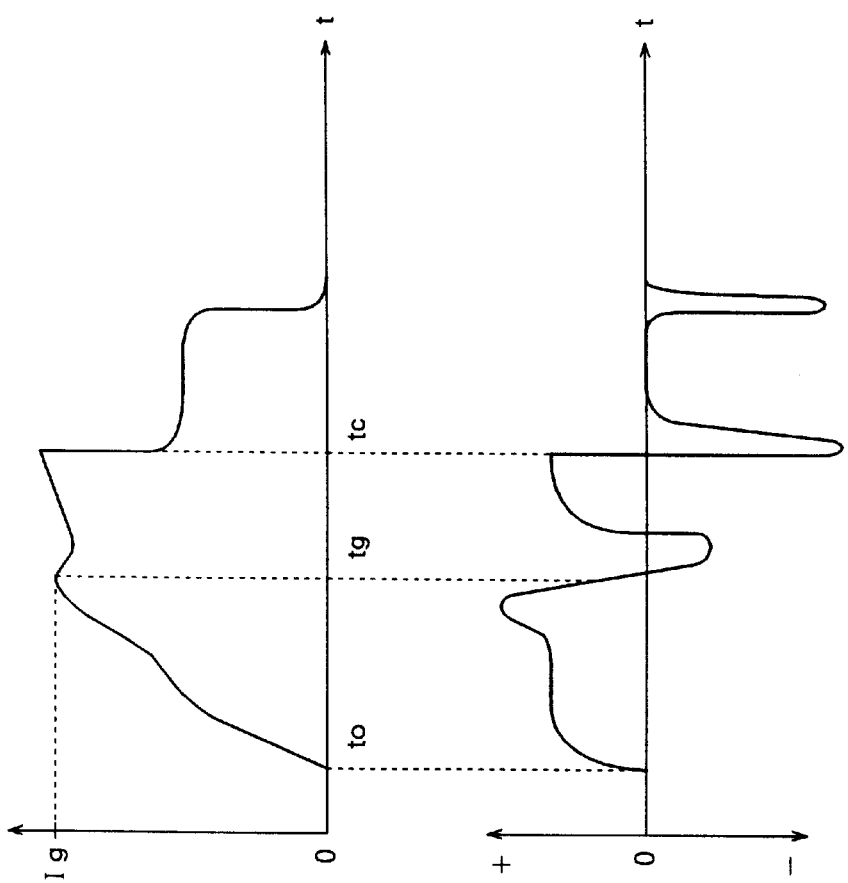
FIG. 16A is an explanation diagram of a driving current for explaining a third embodiment of the present invention.
FIG. 16B is an explanation diagram of a rate of change of the driving current of FIG. 16A.

FIGS. 16A and 16B are diagrams for explaining a third embodiment of the present invention. In this embodiment, a terminating time point tg of overexcitation is determined from a trend of change of a driving current I.

FIG. 16A shows a change of the driving current when an overexciting voltage $V_1$ is applied until a time point $t_c$ exceeding a time point $t_g$ at which a target overexciting current $I_g$ reaches, and FIG. 16B shows a rate of change of the driving current. In FIG. 16A, the overexciting current is temporarily increased and decreased at before and after the time point $t_g$, and this time is a working point of a plunger of a line pressure solenoid 5. At this working point, the rate of change of the overexciting current is changed from plus to minus. In this example, the time at which the rate of change of the overexciting current is changed from plus to minus is determined as a termination time point $t_g$ of the overexcitation. In other words, a microcomputer (CPU) monitors the rate of change of the overexciting current, and terminates the overexcitation at the time point $t_g$ at which the rate of change is change from plus to minus, and changes the applied voltage to the line pressure solenoid 5 to a holding voltage $V_2$.

Furthermore, in place of the above-described method, the driving current during the overexcitation, that is, the overexciting current may be monitored directly, and it is judged whether the overexciting current reaches the target overexciting current $I_g$, and the overexcitation is terminated at a time point $t_g$ when the overexciting current reaches the target overexciting current $I_g$. Furthermore, the overexciting current may be detected indirectly from electrical variables corresponding to the overexciting current, for example, a driving voltage or a resistance value of the line pressure solenoid 5. In this case, a relationship between such electrical variables and the overexciting current may be stored in advance in a table form or the like.

Moreover, in place of the normal selecting lever and the inhibitor switch used in the above embodiments, it is possible to use a selecting lever and an inhibitor switch provided with a so-called manual switch. The selecting lever provided with this manual switch enables the driver to intentionally command upshift and downshift in a condition wherein, for example, a D-range is selected, and a detection signal from the inhibitor switch is attached with a signal commanding the upshift and downshift additionally.

Furthermore, in the above-mentioned embodiments, it is described in detail only as to the case where each control unit is constituted by a microcomputer, the present invention is not limited to this, but each control unit may be naturally constituted by a combination of electronic circuits such as arithmetic circuit and the like.

The present invention provides the following advantages.

As described in the foregoing, according to the driving method and driving apparatus of the solenoid in the present invention, the overexciting current is detected, and at the time point when the overexciting current reaches the minimum overexciting current required to actuate the solenoid, the overexcitation is terminated and the holding voltage is applied. By virtue of this, it is possible to suppress the power consumption and the amount of generated heat during the overexcitation by setting the overexciting time to a required minimum extent, and it is also possible to simplify the circuit structure and to reduce the cost by avoiding the flow of excessively large current larger than required through the solenoid.

Moreover, according to the solenoid driving control apparatus in the present invention, to detect the electrical operational environment of the solenoid, for example, the supply current value to the solenoid is detected, the supply voltage value to the solenoid is detected, the resistance value or the solenoid is detected, or the operational environment temperature of the solenoid is detected, and these values are respectively compared with corresponding ones of a predetermined operational environment to detect the operating condition of the solenoid, and then, for example, in order to make the supply current value to the solenoid as small as possible equal to or larger than the predetermined current value corresponding to the duty ratio, the chopping driving condition of the solenoid is corrected, for example, by changing the on-off period or its relative on time ratio during the chopping drive of the solenoid. Thus, the supply current value to the solenoid can be made to be the smallest value in the on condition, and by virtue or this, it is possible to reduce the energy loss and the amount of generated heat, and further to simplify the structure and to reduce the cost.

What is claimed is:

1. A method of driving a solenoid, wherein in actuating the solenoid, after overexciting the solenoid by applying an overexciting voltage, a holding voltage is applied, said method comprising the steps of:

detecting an overexciting current of the solenoid during the overexcitation at least at two time points, predicting an overexcitation terminating time at which a predetermined target overexciting current is to be reached, from the overexciting currents detected at least at the two time points, terminating the overexcitation when the predicted overexcitation terminating time is reached, and applying the holding voltage.

2. A driving apparatus of a solenoid, wherein in actuating the solenoid, after overexciting the solenoid by applying an overexciting voltage, a holding voltage is applied, said apparatus comprising:

current detecting means for detecting an overexciting current of the solenoid at least at two time points during the overexcitation, predicting means for predicting an overexcitation terminating time at which the overexciting current is to reach a predetermined target overexciting current, and control means for terminating the overexcitation and applying the holding voltage when the predicted overexcitation terminating time is reached.

3. A solenoid driving control apparatus, after overexciting the solenoid, for holding a supplied current value to a predetermined current value by a chopping drive, said apparatus comprising:

operational environment temperature detecting means for detecting an operational environment temperature of the solenoid, current detecting means for indirectly detecting the overexciting current of the solenoid at least at two time points during the overexcitation, from an operational environment temperature of the solenoid, predicting means for predicting an overexcitation terminating time at which the overexciting current is to reach a predetermined target overexciting current, from the overexciting currents detected at least at the two time points, and correcting means for correcting the chopping drive state after the predicted overexcitation terminating time.

4. A solenoid driving control apparatus according to claim 3, wherein, the correcting means changes an on-off period at the time of chopping drive of the solenoid.

5. A solenoid driving control apparatus according to claim 3, wherein, the correcting means changes a relative "on" time ratio at the time of chopping drive of the solenoid.

* * * * *